United States Patent
Guim Bernat et al.

(10) Patent No.: US 11,580,428 B2
(45) Date of Patent: Feb. 14, 2023

(54) DISTRIBUTED AND CONTEXTUALIZED ARTIFICIAL INTELLIGENCE INFERENCE SERVICE

(71) Applicant: Intel Corporation, Santa Clara, CA (US)

(72) Inventors: Francesc Guim Bernat, Barcelona (ES); Suraj Prabhakaran, Aachen (DE); Kshitij Arun Doshi, Tempe, AZ (US); Da-Ming Chiang, San Jose, CA (US); Joe Cahill, Rathmore (IE)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 17/668,844

(22) Filed: Feb. 10, 2022

(65) Prior Publication Data
US 2022/0269960 A1 Aug. 25, 2022

Related U.S. Application Data

(63) Continuation of application No. 15/857,087, filed on Dec. 28, 2017, now Pat. No. 11,250,336.

(51) Int. Cl.
*G06N 5/04* (2006.01)
(52) U.S. Cl.
CPC .................................. *G06N 5/04* (2013.01)
(58) Field of Classification Search
None
See application file for complete search history.

(56) References Cited

U.S. PATENT DOCUMENTS

| | | |
|---|---|---|
| 11,250,336 B2 | 2/2022 | Guim Bernat et al. |
| 2018/0270820 A1 | 9/2018 | Gupta et al. |
| 2019/0042955 A1 | 2/2019 | Cahill et al. |
| 2022/0116736 A1* | 4/2022 | Williams ........... G06Q 20/3224 |

(Continued)

OTHER PUBLICATIONS

"U.S. Appl. No. 15/857,087, Non Final Office Action dated Nov. 13, 2020", 23 pgs.

(Continued)

*Primary Examiner* — Bradley Smith
(74) *Attorney, Agent, or Firm* — Schwegman Lundberg & Woessner, P.A.

(57) ABSTRACT

Various systems and methods of initiating and performing contextualized AI inferencing, are described herein. In an example, operations performed with a gateway computing device to invoke an inferencing model include receiving and processing a request for an inferencing operation, selecting an implementation of the inferencing model on a remote service based on a model specification and contextual data from the edge device, and executing the selected implementation of the inferencing model, such that results from the inferencing model are provided back to the edge device. Also in an example, operations performed with an edge computing device to request an inferencing model include collecting contextual data, generating an inferencing request, transmitting the inference request to a gateway device, and receiving and processing the results of execution. Further techniques for implementing a registration of the inference model, and invoking particular variants of an inference model, are also described.

14 Claims, 10 Drawing Sheets

(56) References Cited

U.S. PATENT DOCUMENTS

2022/0253632 A1\* 8/2022 Lin .................. G06N 20/00
2022/0300617 A1\* 9/2022 Vishik ............... G06F 16/152

OTHER PUBLICATIONS

"Public Views of Artificial Intelligence and Intellectual Property Policy", USPTO, (2020), 56 pgs.
"U.S. Appl. No. 15/857,087, Response filed Feb. 15, 2021 to Non Final Office Action dated Nov. 13, 2020", 15 pgs.
"U.S. Appl. No. 15/857,087, Examiner Interview Summary dated Feb. 23, 2021", 2 pgs.
"U.S. Appl. No. 15/857,087, Final Office Action dated May 21, 2021", 10 pgs.
"U.S. Appl. No. 15/857,087, Examiner Interview Summary dated Aug. 6, 2021", 2 pgs.
"U.S. Appl. No. 15/857,087, Response filed Aug. 23, 2021 to Final Office Action dated May 21, 2021", 13 pgs.
"U.S. Appl. No. 15/857,087, Advisory Action dated Sep. 1, 2021", 3 pgs.
"U.S. Appl. No. 15/857,087, Notice of Allowance dated Oct. 5, 2021", 9 pgs.
Blogs, "Difference-deep-learning-training", [Online]. Retrieved from the Internet: https: blogs.nvidia.com blog Aug. 22, 2016 difference-deep-learning-training-inference-ai, (2016), 20 pgs.
Wikipedia, "Machine Learning", [Online]. Retrieved from the Internet: https: en.wikipedia.org wiki Machine_learning, (2020), 22 pgs.

\* cited by examiner

DISTRIBUTED AND CONTEXTUALIZED ARTIFICIAL INTELLIGENCE INFERENCE SERVICE

PRIORITY APPLICATION

This application is a continuation of U.S. application Ser. No. 15/857,087, filed Dec. 28, 2017, which is incorporated herein by reference in its entirety.

TECHNICAL FIELD

Embodiments described herein generally relate to interconnected device networks, and in particular, to techniques for conducting artificial intelligence (AI) processing operations implementing functionality among internet of things (IoT) devices, device networks, and related network-based services.

BACKGROUND

IoT devices are physical objects that are adapted to communicate on a network, and such devices may include sensors, actuators, and other input/output components to collect data and perform actions in a real world environment. For example, IoT devices may include low-powered devices that are embedded or attached to everyday things, such as buildings, vehicles, packages, etc., to provide an additional level of artificial sensory perception or control of those things. Recently, IoT devices have become more popular and thus applications and use cases of these devices have proliferated.

Various services have been proposed for use with IoT devices, including SaaS (Software-as-a-Service), FaaS (Function-as-a-Service), and AIaaS (AI-as-a-service), to expose capabilities that can be discovered and used by dynamic requestors transparently and efficiently. However, such approaches often assume that the requestor clients know what is the best or the appropriate service instance to execute. For example, in the context of an AI inference model, an IoT client may want to use a particular accelerated function that takes specific input and parameters (e.g., consider a navigation service that takes a starting and destination point as inputs). Although multiple AI services or service types may be exposed (e.g., from multiple navigation services), the different services are often configured to support different categories of inferences depending on the amount and type of data available from the client, such as the type of sensors available, the model of the client device, and the like.

With current approaches, the use and selection of multiple services would be supported by having interfaces at the edge-accessible cloud that explicitly expose these service variants to clients. Likewise, with current approaches, the clients would need to include programming and rules that explicitly request a particular service variant. As a result, significant configuration and pre-processing must be utilized to employ AI inference models.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

DETAILED DESCRIPTION

Figure 1:
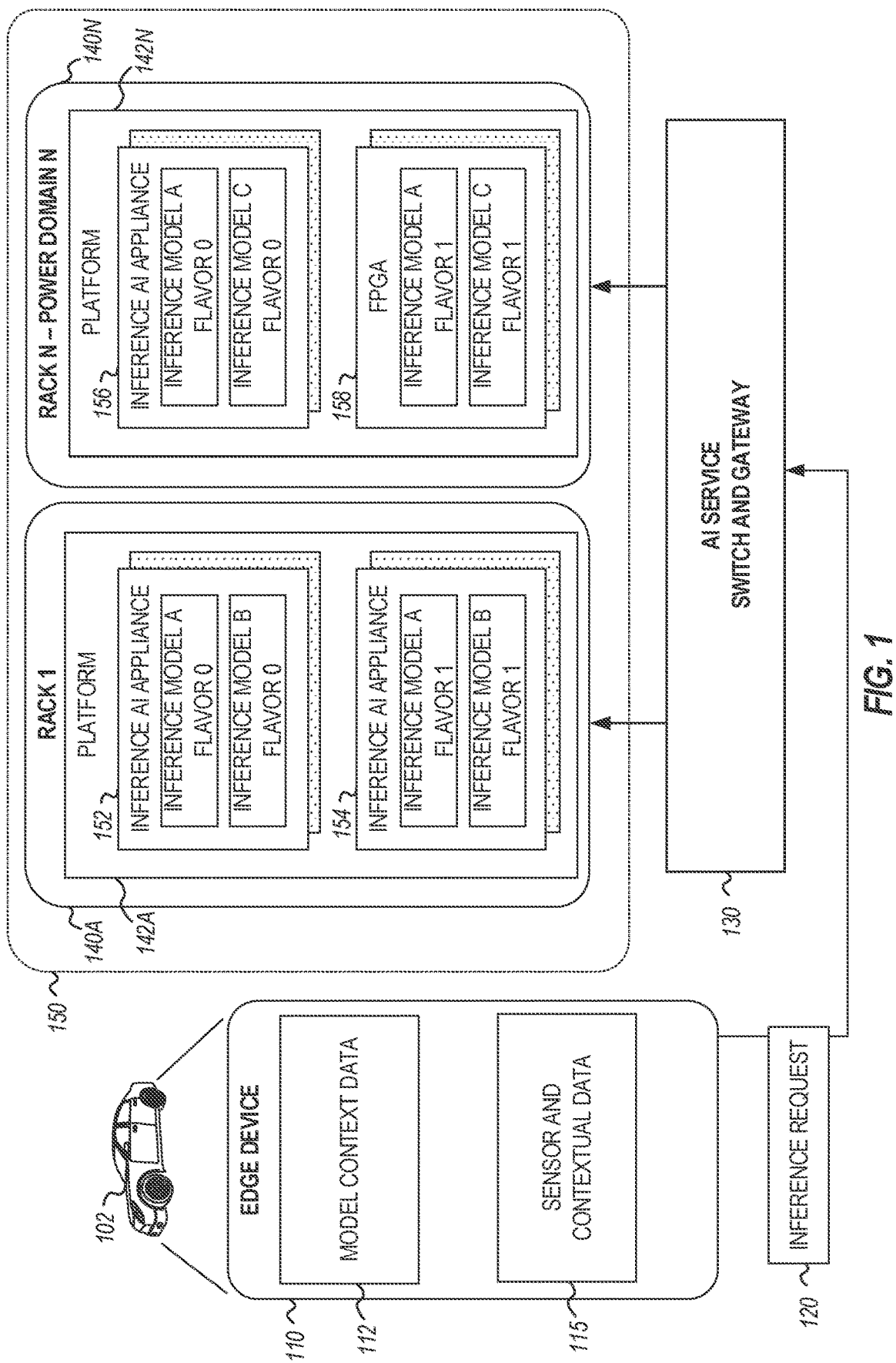
FIG. 1 illustrates a scenario for use of an AI inference service, supported by a plurality of AI inference models and model variations, according to an example.

In the following description, methods, configurations, and related apparatuses are disclosed for contextualizing and deploying artificial intelligence solutions as services accessible with IoT networks and distributed network schemas. The approaches discussed herein provide wide range adaptation that may be used for handling AI inferencing requests in continuously changing, multi-faceted, nuanced, and variously-constrained forms at an edge of a network topology. Such inferencing requests often arrive at very high speeds and may require immediate dispatch and results. The present techniques address these and other technical constraints, while establishing a technical configuration and set of operations for accomplishing dynamic functionality.

Demand is steadily growing for the use of hardware-accelerated AI algorithms for drawing on-demand (and often, very high-speed) inferences, especially in IoT network deployments. In this context, a cloud-type network service that is exposed to client edge devices, also referred to as an "edge cloud", may provide AI inference services and functionality to a variety of edge devices that change location or operating characteristics within the IoT network environment. Further, at the time of use of these AI inference services, different client edge devices may furnish additional data from newer sensors (or from the environment of these newer sensors). As a result, a variety of dynamic use cases have arisen to invoke AI functioning from richer and changing information.

As discussed herein, the present techniques and configurations provide improvements for these and a variety of other IoT device, Fog network, and data center operation use cases involving AI functions and operations. The present configurations include the deployment of client device (edge), gateway (fog/intermediate), and server (cloud/remote) functions for selecting variations of AI inferencing models. This allows the application of respective inference models in changing scenarios involving mobility, particularly where an IoT device (e.g., an edge device) moves around to a number of edge network locations and generates distinct sensor data in a number of environments.

The present configurations result in a number of technical benefits, including the selection of appropriate processing and network resources, the distribution of processing operations towards edge devices, and the reduction of unnecessary or improper resource usage. These and other benefits of the presently disclosed approaches within distributed network implementations and similar IoT network settings will be apparent from the following disclosure.

Current implementations of AI inference services are likely to encounter some or all of the following technical limitations: (1) such services do not consider client contextual data; (2) such services do not consider that when changing device characteristics and capabilities (e.g., from one edge antenna or base unit to another one), the type of available models exposing an accelerated AI model may change; and (3) with conventional use of such services, the same client requestor would need to be furnished with different discoverable capabilities at different times, even if there is not adequate time to pre-discover an appropriate hardware-accelerated variant of a function. The system configuration provided in the following examples enable use of a new type of AI as a Service (AIaaS) contextualized inference that is able to transparently consider contextual details, and in particular, to consider sensor data and capabilities of a client edge device. A gateway that is exposed at the edge of the cloud network is provided to redirect the requests to the proper AI inference appliance based on this sensor data. Correspondingly, new logic may be enabled inside the IoT or edge client, to allow a software management stack to register and consume a particular AIaaS even as the software management stack is contextualized and bound to a set of sensors or data sets.

FIG. 1 depicts an example scenario for use of an AI inference service, as supported by a plurality of AI inference models and model variations. Specifically, the scenario of FIG. 1 depicts an edge device 110 requesting AI inference data from an AI service switch and gateway 130 via inference request 120. The AI service switch and gateway 130 in turn communicates with a data center 150, which is a cloud-based location that provides (and in some examples, executes) an AI inference model. The flow of AI inference data (e.g., results) from the data center 150 back to the edge device 110 is not shown; however, it will be understood that a variety of use cases involving the communication or use of AI-based inference data may be provided back to the edge device 110 in this environment.

In an example, the AI inference model is operated or otherwise provided by the data center 150 in the form of an AI-as-a-service (AIaaS) deployment. In this fashion, specific AI data operations may be requested and offloaded from the edge device 110 to the cloud, for performance on demand with an inference model operating on platform 142 (e.g., operating on one or more of platforms 142A-142N). However, other examples and uses of an AI inference model may also be provided by the variations of the present architecture and network topology. In particular, the use of the presently described switch and gateway 130 may enable the performance of AI inference operations within a network fog or distributed computing devices. Thus, references to the operation of the AI inference models in a "cloud" and "data center" are used merely for purposes of simplicity.

Figure 2:
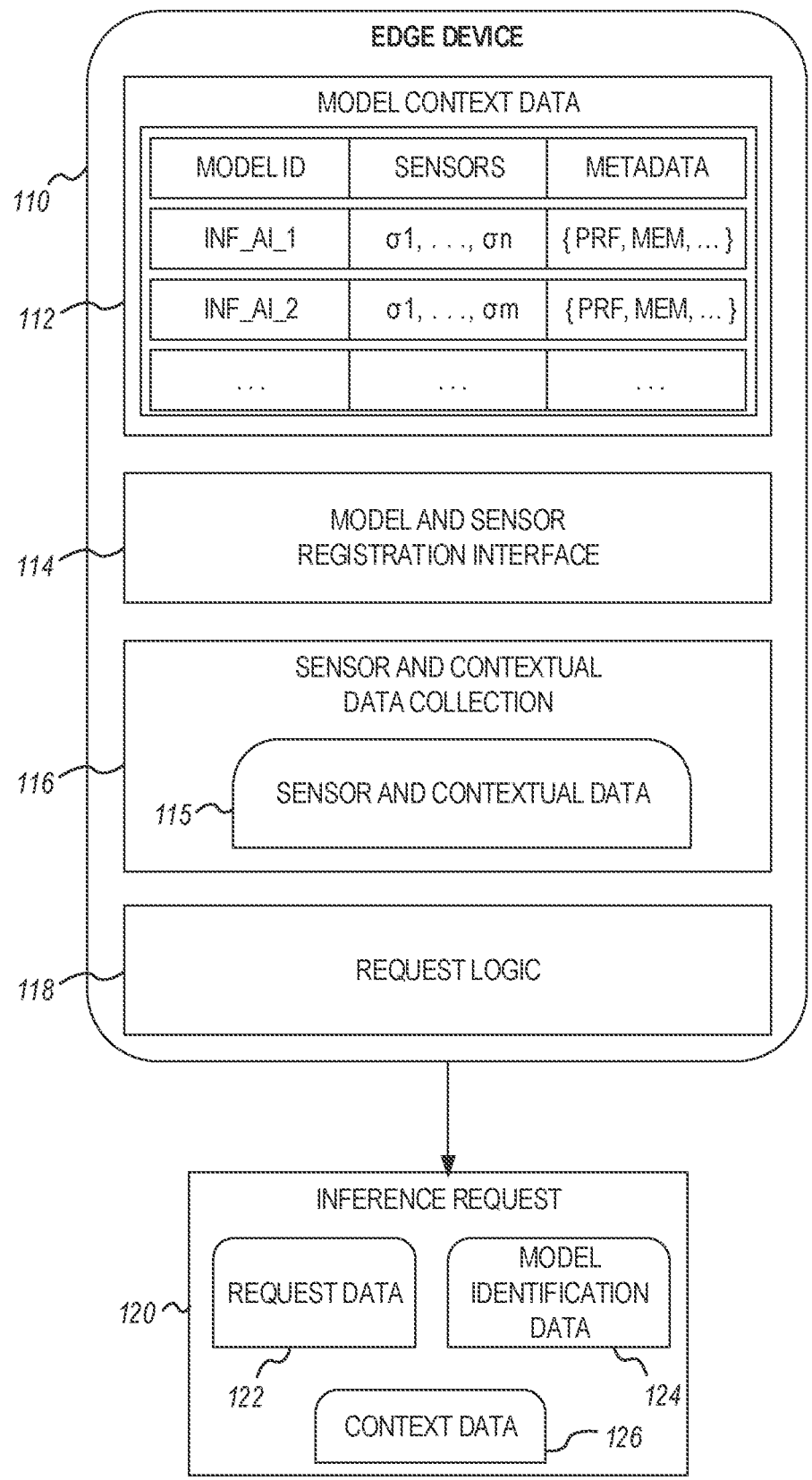
FIG. 2 further illustrates functionality for AI inference processing in an IoT edge device, according to an example.

As shown in the example scenario, the edge device 110 is a device that comprises or is embodied in a host system 102 (as depicted, an automobile). The edge device 110 generates model context data 112 and sensor and contextual data 115, such as through the operation of various sensors and data collection components in the edge device 110, the host system 102, or other coupled functionality. A further breakdown and usage of the model context data 112 and the sensor and contextual data 115 with the edge device 110 is depicted in FIG. 2 and discussed below. The data that the edge device 110 provides, however, is not limited to sensor data; other forms of static and dynamic information (e.g., device characteristics, data generated by software running on the device) may be generated or provided from the edge device 110.

As also shown in the example scenario of FIG. 1, the data 112, 115 is used to create an inference request 120, which is communicated to the AI service switch and gateway 130 for further processing. The inference request 120 may communicate conditions, states, and characteristics of the current operation of the edge device 110, in addition to a specific inference request or task. The inference request 120 may also communication information regarding specific inference service requirements and functions for the edge device 110 or the executable task. As discussed in the following examples, this inference request 120 is interpreted by the AI service switch and gateway 130 and used to select and invoke particular types and variations (flavors) of AI inference model implementations.

A variety of AI data processing use cases that occur at the edge device 110 may be enabled through the functionality discussed herein. For instance, consider an example scenario where an IoT client system (such as the automobile 102, or another device such as a car, a bike, or a mobile device) wants to use an AI inference service, "RouteService", to identify the fastest route from a current location to a given destination. While a standard cloud-based implementation of RouteService may propose a "best" route, the proposed route may be less than ideal, depending on the type of vehicle (e.g., whether a bike, car, commercial delivery vehicle) and current conditions of the vehicle (e.g., running low on fuel, low tire pressure, etc). For example, if the IoT client system is a bike and the bike has tires with a low tire pressure, it may be desirable to pick a road that includes less gravel; likewise, a car running low on fuel might be better directed by a route that has more possibilities for refueling. Additionally, the requests to the AI inference model may need to be served instantaneously for many different requestors and device types, in a variety of use case scenarios.

Continuing this example, consider a scenario where a variant of the RouteService inference service is able to utilize additional sensor data, but the requesting edge device 110 may not be aware of the existence of the variant or how to invoke or redirect a request to the variant. With conventional approaches, different types of models and functions often require the use of specifically-programmed interfaces at the edge that explicitly expose different variants to clients. Likewise, with conventional approaches, the clients would explicitly request the particular variant. However, use of such approaches requires that the clients pre-determine what is the best or the most appropriate accelerated service instance they want to execute. This is not feasible in many settings of AI and accelerated function usage. The techniques discussed herein enable registration and identification of inference model types and variations of the model types (flavors), which allow the dynamic selection and execution of a variety of instances of AI inference models.

In the scenario depicted in FIG. 1, the cloud exposes AI inference models that are implemented in different "flavors". As used herein, these different "flavors" refers to variations in implementations or sub-types of a model instance, which may operate with different input, execution, or output characteristics. In the depicted scenario, examples of the AI model inferencing flavors are in the form of "Inf Model A, Flavor 0", "Inf Model C, Flavor 1", etc., with such nomenclature being used to signal that multiple models (A, B, C, D, etc.) are available as accelerated inferencing assets and are identified to other components. Further, each model could have more than one variant flavor (flavors 0, 1, 2, etc.), with flavors corresponding to different contextualizations available from clients (and prediction scenarios) that may be invoked as these flavors are also identified to other components of the system.

As also shown in the depicted scenario, the multiple models and flavor variations are not limited to a single platform implementation in the data center 150 or the cloud. Such models and flavor variations may also be distributed across more than one appliance or hardware implementation (e.g., inference AI appliances 152, 154, 156, or field-programmable gate array (FPGA) 158), more than one chassis implementation (e.g., on platform 142A on rack 1 140A, and on platform 142N on rack 140N), or even distributed across different racks or enclosures in independent power domains.

The various AI inferencing requests may be amplified with associated context data, as a result of a software stack running on the edge device 110. This software stack may collect the context data and provides it to the AI service gateway 130, as part of respective inference requests (e.g., inference request 120). For example, in the context of an AIaaS deployment, an IoT client may want to use a specific accelerated function of the RouteService navigation service, "RouteTo", which takes point and destination. For example, consider that an edge device needs to invoke RouteService in the edge cloud; the high level flow of actions that results is: the software (in the edge device 110) calls RouteService; the device-side software stack collects data from additional sensors 1 . . . n (e.g., sensors σ1-σn); and the software stack forwards the additional data to the AIaaS cloud service via the gateway 130. The gateway 130 matches up an AI appliance (e.g., one of appliances 152, 154, 156, which includes an implementation of a particular model and flavor combination). The AIaaS performs the enhanced inference based on both the formal request (e.g., request parameters) and the additional, contextualizing sensor data provided by the inference request 120.

As will be apparent, a variety of technical advantages may be provided from the presently disclosed configuration and deployment of AIaaS inferencing services. For instance, such services may be adapted to the capabilities and requirements of edge clients, under the many real-world conditions and scenarios where accelerated models can deliver local customizations. Such services may simplify access to dynamically contextualized solutions, provide end customers with improved knowledge and usefulness, and offer differentiated capabilities in a variety of IoT deployment environments. This is further extended by data-driven continuous customization of services.

Additionally, such inferencing services may result in technical advantages for energy and computing savings, while delivering expedited processing results that are dynamically selected. In some context situations, the AI inference service can be simpler and quicker to save the energy and service computation time. Such results may be further extended by the use of contextual data, which may include pre-processed data by the client. For instance, a client edge device may utilize limited, local resources perform some preliminary computing, such as for example, calculating a background noise level captured by a sensor to match the proper AI inference model in the cloud.

Other technical advantages may be time adaptive, as an intermediate system (e.g., the gateway 130) performs dynamic mapping from requested models (e.g., model IDs) to physical realizations of inferencing services. Thus, even as sensor data and the location of the requestor (e.g., the edge device 110) changes, the behavior of the requestor may also automatically change to fit the services available in a different environment as well as those available at a different time.

FIG. 2 provides a further illustration of example functionality for AI inference processing in the IoT edge device 110. The functionality may be implemented in logic (e.g., with programmed software instructions) on the IoT edge device 110, to include the following elements. Although the following functionality is depicted as separate components operating with the edge device 110, it will be understood that additional or fewer components may also be utilized to implement the functionality.

In the depicted example, model context data 112 is established on the edge device 110 to map a list of model IDs of a cloud-accessible AI inferencing service to various sets of the sensors, where such sensors provide the model with the enhanced contextual data. The model context data 112 may further include other metadata relevant to invocation of the AI inferencing service, such as quality attributes indicating the ideal (or required) performance and capacity that a given request will use from the service, performance or latency characteristics, and computing resource (e.g., memory, processing) requirements. This information may be stored in the edge device 110 in the form of a table or another data structure.

Also in the depicted example, a model and sensor registration interface 114 is used on the edge device 110 to register the respective inferencing models and the contextual data that the edge device 110 will bind with, when making the requests. Models that are registered may be accordingly updated in the model context data 112 table for subsequent lookup and use operations.

Also in the depicted example, the sensor and contextual data collection functionality 116 is established on the edge device 110 to collect the contextual (e.g., sensor-derived) data from the edge device 110 (or the environment of this device, or related sensors or components). When an inference request is sent to the cloud service, the sensor and contextual data collection functionality 116 will collect the required data from related sensors by looking up the model context data 112. In an example, the model context data 112 table stores respective model identifiers, sensor identifiers, and metadata identifiers, for each data table entry. Additional data fields and data types may be tracked by the model context data 112 table and supplied from the sensor and contextual data collection functionality 116. In an example, the model identifier is an established UUID that is unique and agreed upon by the various network participants (such as different devices and providers).

Also in the depicted example, the request logic 118 is established on the edge device 110 to create an inference request (e.g., inference request 120) according to the protocols between the edge cloud and the client. The request logic 118 further sends the inference request 120, which includes the model ID and data, from the edge device 110 to the gateway 130 (e.g., as depicted in the environment of FIG. 1), to invoke the AIaaS inference model.

FIG. 2 also illustrates an example format for the inference request 120. As shown, the inference request 120 may include request data 122, model identification data 124, and context data 126. In an example, the request data 122 is generated from execution of the request logic 118, for a specific type or feature of a selected AI model; the model identification data 124 is generated from an indication the selected AI model, registered in the model context data 112; the context data 126 may include contextual data values derived from one or more sensors, such as data values indicating an environmental or computing conditions of the edge device 110 or a larger system or platform.

Figure 3:
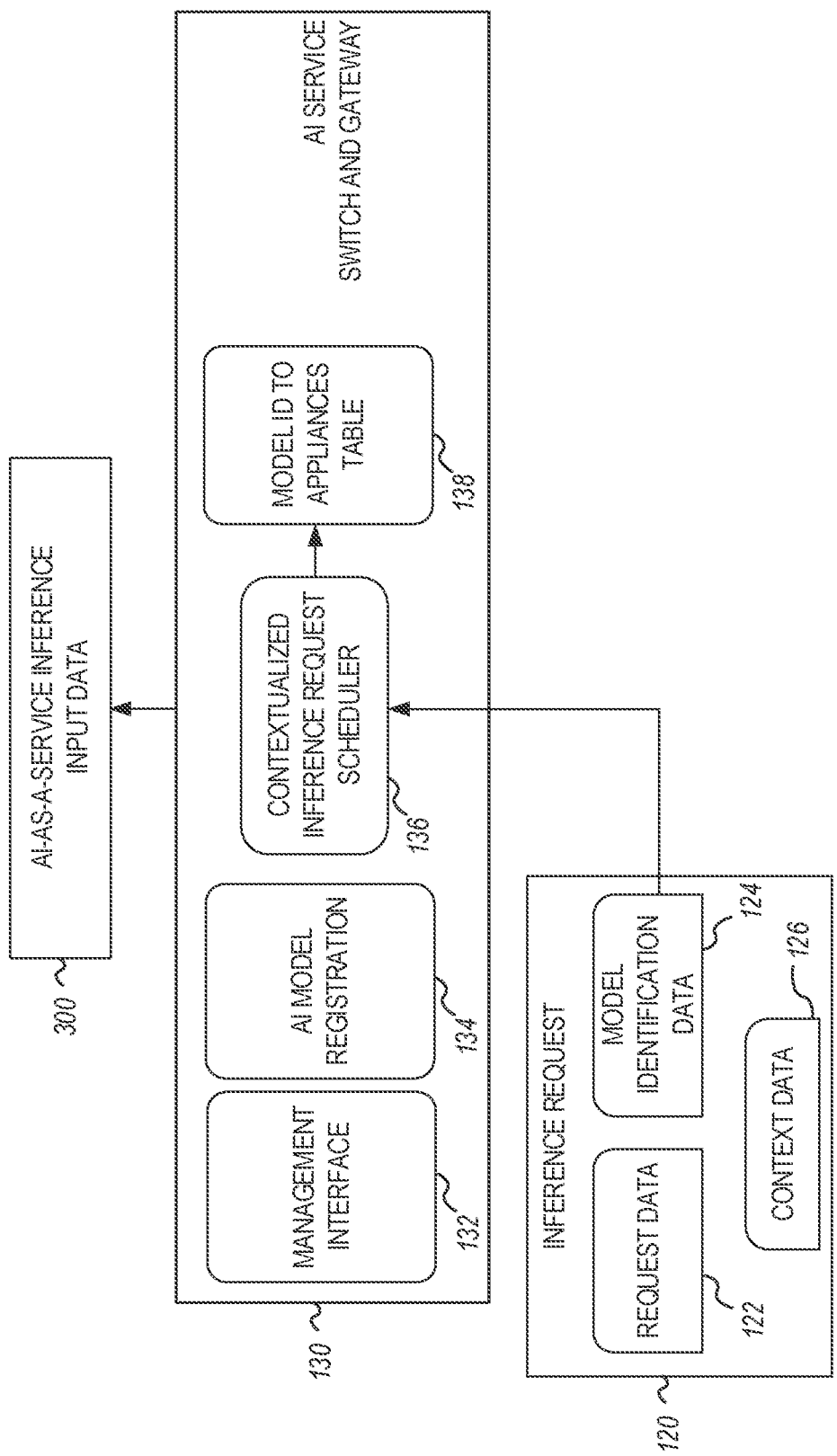
FIG. 3 further illustrates functionality for an AI switch and gateway, according to an example.

FIG. 3 provides a further illustration of example functionality of the AI Service switch and gateway 130. As shown, the AI Service switch and gateway 130 includes features to allow registration and selection of inference models, and to process and forward AIaaS inference data 300 for use within a platform (such as platforms 142A-142N). As discussed above with reference to FIG. 2, the inference request 120 may include aspects of request data, model identification data 124, and context data 126, which are provided to the switch and gateway 130 and one or more of the respective interfaces and functionalities.

In the depicted example, the AI Service switch and gateway 130 includes a management interface 132. The management interface 132 enables the gateway 130 to manage, start, modify, or stop execution on the various services/appliances used to provide the AI functionality (such as the respective appliances 140A-140N operating in platforms 142A-142N). Further, the management interface 132 can repurpose network edge acceleration resources so that the services available in the edge network are adapted or optimized according to a client's request frequencies, such as for operations that tend to get used more or less, and the like.

Also in the depicted example, the AI Service switch and gateway 130 includes AI model registration functionality 134. The model registration functionality 134 may be used to register clients (e.g., edge device 110) as requestors for AI models, although in some examples such clients may not be registered to individual flavor variants of the AI models. This enables the switch and gateway 130 to provide dynamic mapping of requests to different flavors of AI inference model implementations according to the context data. Additionally, by allowing clients to be categorized by model, the switch and gateway 130 permits the use of a substitute flavor implementation that may be adequate for a given need, even if the substitute flavor implementation is less powerful or includes fewer features.

Also in the depicted example, the AI Service switch and gateway 130 includes a model-to-appliance map 138, such as may be implemented by a data table or like data structure. The map 138 may be used to map a model identifier to various physical acceleration modules in the different acceleration assets in the edge network that implement that AI inference model and the flavors of that model that those assets implement.

Also in the depicted example, the AI Service switch and gateway 130 includes a contextualized AI request scheduler 136. This functionality may be used to look up the inference request (e.g., indicated in the request data 120) and consult the mapping (e.g., map 138) to identify and schedule a particular acceleration module appliance (e.g., one of the appliances 152, 154, 156). This appliance may be selected to be a best available choice according to the requirements and performance attributes included along with the request. In addition, the contextualized AI request scheduler 136 may perform simple load balancing to achieve fairness, such as to meet soft or hard real-time requirements defined for clients quickly and dynamically.

Although not depicted, the switch and gateway 130 may implement other aspects of AI request and execution operations, including aspects of training, feedback, optimization, and selection of parameters for various algorithms implemented in AI models. These algorithms may include any number of machine learning, classification, or rule-based implementations. Further, although not depicted, output or execution data from the AI inferencing service may be provided back to the switch and gateway 130 for use in the same or subsequent data processing operations.

Figure 4:
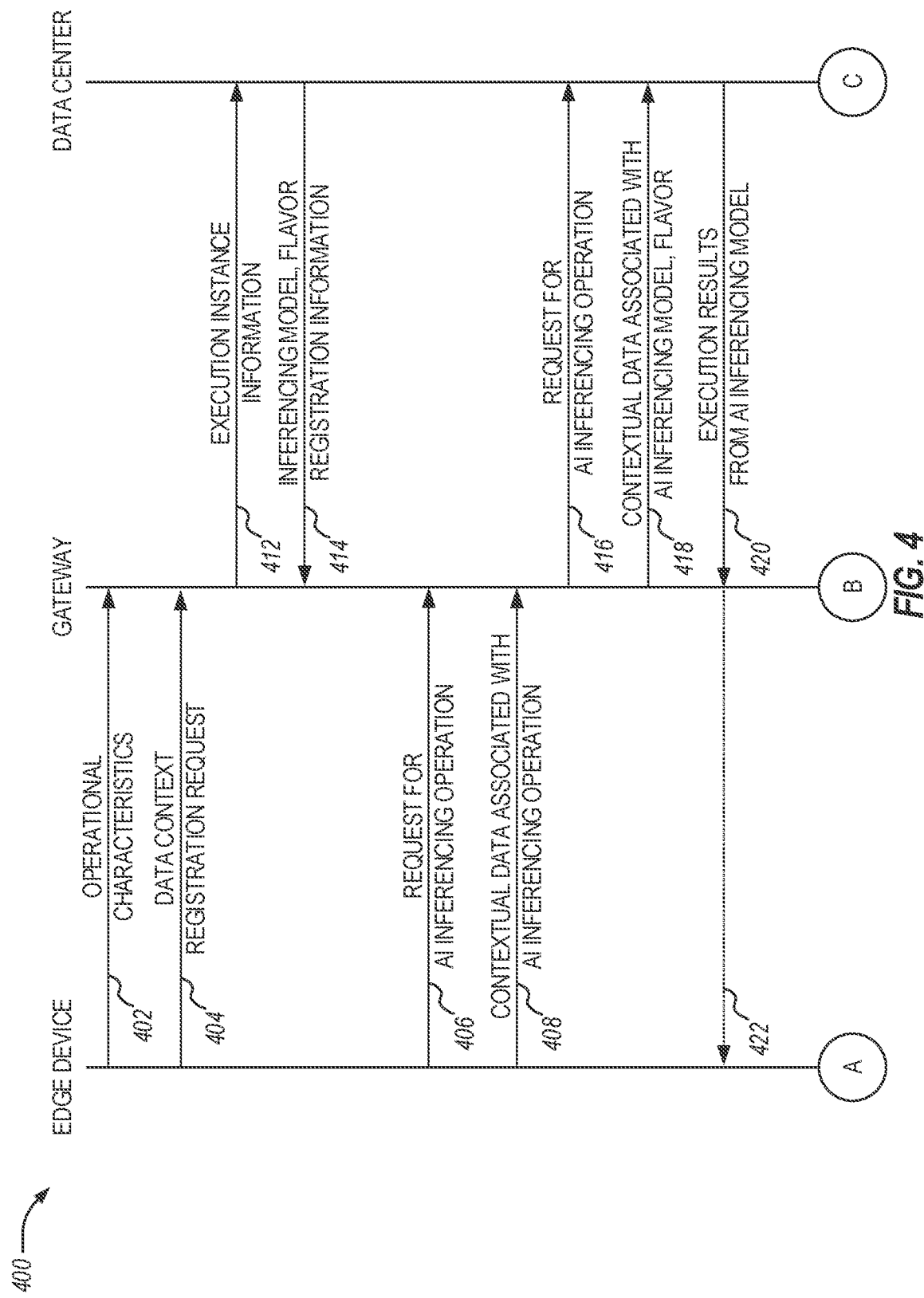
FIG. 4 illustrates operations among an edge device, gateway, and data center, for implementing AI inference processing, according to an example.

FIG. 4 illustrates a sequential flow 400 of example communication operations among an edge device, gateway, and data center, for implementing AI inference processing. It will be understood that the flow 400 is intended as an example implementation scenario of the preceding techniques, showing end-to-end communications among respective entities. However, substitute communications and variations to the operations may result in certain operations being consolidated or omitted from the flow 400. Also, although only three entities are depicted, it will be understood that additional entities or entity subsystems may be involved with implementation of the flow 400.

As depicted, the sequential flow 400 commences with the communication of operational characteristics from an edge device (e.g., edge device 110, discussed above) to a gateway (e.g., switch and gateway 130, discussed above) (communication 402). These operational characteristics may be used by the gateway to determine the types, locations, and functionality of edge devices operating in the network. As also depicted, the sequential flow 400 continues with the communication of a data context registration request (communication 404), for establishing the use of an AI inference model service. As discussed above, this registration (communication 404) may include communication of available types of data, available sensors, and the contexts in which inferencing operations may be invoked. Although not depicted, the operations in this phase exchanged between the edge device and gateway may also include aspects of discovery and capability negotiation.

The sequential flow 400 continues with the communication of execution instance information from a gateway to a data center (communication 412), and the receipt of inferencing model and flavor variant registration information from the data center to the gateway (communication 414). For instance, the gateway may query regarding the types of inferencing models and operations required by registered edge devices; the data center may respond with a listing of respective implementations. This listing of respective implementation may specify the available hardware implementations of a respective model, flavor variations on the respective model (including the types of operations and operation parameters supported by the respective model), and other information used for registering the model and flavor variation with the gateway.

The sequential flow 400 continues to depict a use case for an AI inferencing operation, provided by a request transmitted from an edge device to a gateway, to invoke the inferencing operation (communication 406). Within, concurrent to, or in connection with this request, contextual data that is associated with the inferencing operation is communicated from the edge device to the gateway (communication 408). As discussed in the examples above, the amount, type, and form of this request and contextual data may vary based on an operational environment of the edge device.

The sequential flow 400 continues with the gateway invoking an instance and flavor variation of the AI inferencing service, by communicating the request for the AI inferencing operation to a particular model implementation and flavor variation of the data center (operation 416), and communicating the contextual data associated with the AI inferencing model and flavor variation to the data center (operation 418). This results in the execution of the inferencing operation, by the particular AI inferencing model and flavor variation, and the generation of execution results (not shown). The execution results from the AI inferencing model may be communicated back to the gateway (communication 420) and ultimately to the edge device (communication 422). Other communications, not depicted in the sequential flow 400, may provide variation to the delivery or use of this results data.

Figure 5A:
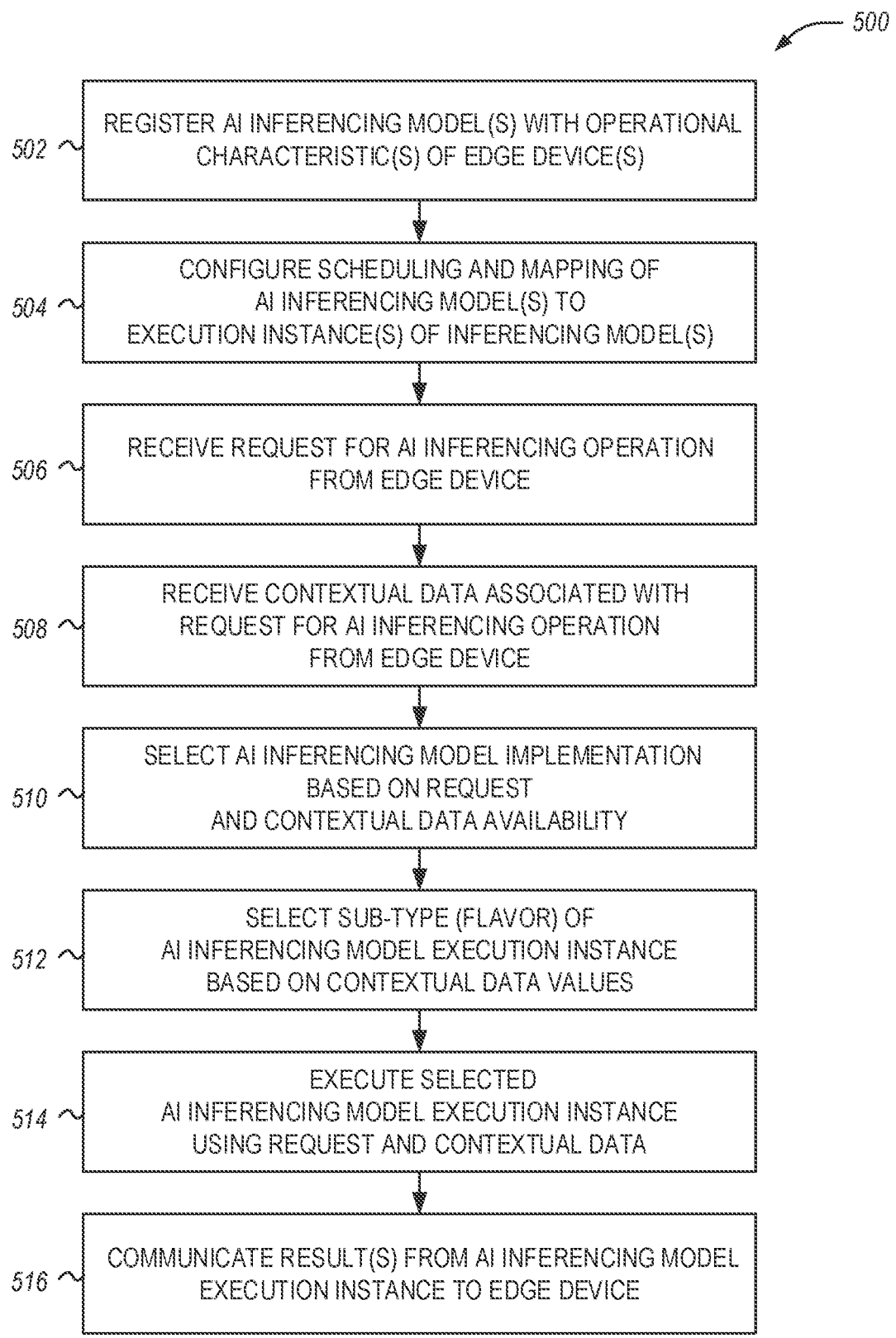
FIG. 5A illustrates a flowchart of a gateway-based method for implementing and utilizing a distributed and contextualized AI inference service, according to an example.

FIG. 5A illustrates a flowchart 500 of an example method for implementing and utilizing a distributed and contextualized AI inference service. This flowchart 500 provides a high-level depiction of operations used to obtain, process, and output data, enabling and performing contextualized AI inferencing, from the perspective of a gateway or other intermediate computing device. However, it will be understood that additional operations (including the integration of the operations from sequential flow 400 of FIG. 4, or the functionality of the respective processing components as illustrated in FIGS. 1 to 3) may be implemented into the depicted flowchart 500.

In an example, the operations depicted in the flowchart 500 commence with precondition operations to register one or more AI inferencing model(s) with operational characteristic(s) of respective edge device(s) (operation 502). Based on this registration, the gateway may operate to configure scheduling and mapping of the respective AI inferencing model(s) to one or more execution instance(s) of inferencing model(s) at a remote computing system (operation 504). For instance, such operations may include registering a plurality of distinct AI inferencing models, by establishing a mapping of a model identifier of a respective AI inferencing model to a respective hardware configuration used in the remote computing system, and registering a specification of a respective AI inferencing model to be associated with a particular data set or a set of sensors of an edge device.

The operations of the flowchart 500 continue with the receipt of a request for an artificial intelligence (AI) inferencing operation from an edge device (operation 506), and the receipt of contextual data associated with the request for the AI inferencing operation (operation 508). In an example, the request includes the contextual data and a specification of a particular AI model (e.g., based on an AI model or model type identifier); in other examples, the gateway may determine the particular AI model to invoke. In a specific example, the contextual data indicates at least one of: condition of a network connection with the edge device, sensor data collected from a sensor operably coupled to the edge device, or pre-processed data generated by the edge device.

The flowchart 500 further depicts the gateway performing operations to select the inferencing model implementation based on the request and contextual data availability (or contextual data contents) (operation 510), such as in a scenario where the model implementations operate on respective hardware configurations at the remote computing system. The gateway may additionally perform operations to select a sub-type (e.g., a flavor variation) of an AI inferencing model execution instance, based on the contextual data availability (or contextual data contents) (operation 512). For instance, in an example, at least two variations of the AI inferencing model are respectively customized to different sets of data inputs provided in the contextual data. In a further example, the implementation of the AI inferencing model is selected based at least in part on time-adaptive characteristics of executing the selected implementation at the remote computing system, where the respective implementations of the AI inferencing model are invoked at respective times. In still further examples, metadata that is provided in the contextual data may include performance characteristics which indicate required response times or time-based constraints.

The flowchart 500 concludes with the execution of the selected AI inferencing model execution instance, at the remote computing system, using the request and contextual data (operation 514), and the communication of the results from execution back to the edge device (operation 516). In an example, the remote computing system is a cloud service hosted by a plurality of servers, and the cloud service hosts the respective hardware configurations among a plurality of hardware platforms. In a further example, the respective hardware configurations of the cloud service include at least one server appliance system and at least one field-programmable gate array (FPGA) configured to execute at least a portion of the implementation of the AI inferencing model.

Figure 5B:
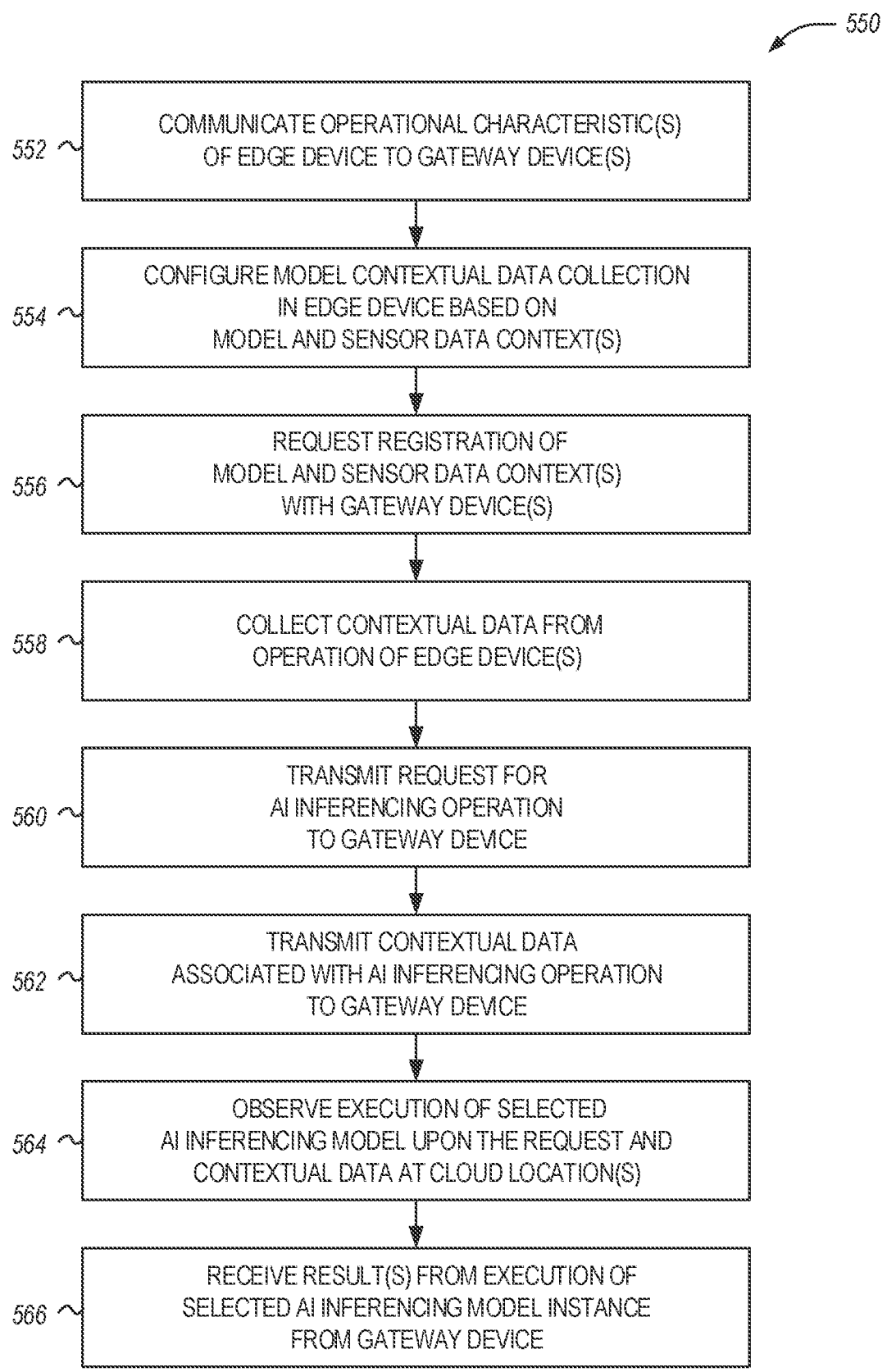
FIG. 5B illustrates a flowchart of an edge device-based method for implementing and utilizing a distributed and contextualized AI inference service, according to an example.

FIG. 5B illustrates a flowchart 550 of an example method for implementing and utilizing a distributed and contextualized AI inference service. This flowchart 550 provides a high-level depiction of operations used to obtain, process, and output data for enabling and performing contextualized AI inferencing, from the perspective of the edge device. However, it will be understood that additional operations (including the integration of the operations from flowchart 500, sequential flow 400, and functionality of the components as illustrated in FIGS. 1 to 3) may be implemented into the depicted flowchart 550.

In an example, the operations depicted in the flowchart 550 commence with the communication of operational characteristics of the edge device to one or more gateway devices (operation 552), and the configuration of a model context data collection at the edge device, based on various model and sensor data contexts (operation 554). For instance, as discussed with reference to FIG. 2 above, this model context data collection may include a mapping of various models to sensors and metadata types, values, or characteristics.

The operations in the flowchart 550 continue with requesting registration of the model and sensor data contexts with the respective gateway devices (operation 556), such as discussed above with reference to FIG. 5A (operation 502). The flowchart 550 continues with the collection of contextual data from operation of the edge device, such as with the operation of sensors operably coupled to the edge device.

The operations in the flowchart 550 also continue with the transmission of the request for the AI inferencing operation to a particular gateway device (operation 560) and the transmission of contextual data associated with the AI inferencing operation to the particular gateway device (operation 562), such as discussed above with reference to FIG. 5A (operations 506, 508). In some examples, the edge device may further observe (e.g., monitor, verify) the execution of the selected AI inferencing model upon the request and contextual data, as executed at the respective cloud locations (operation 564). The operations in the flowchart 550 then conclude with the receipt of one or more results from the execution of the selected AI inferencing model instance (operation 566), from the gateway device, directly from the cloud service, via an intermediate device, or via other data communication mechanisms.

Although the network configurations depicted above were provided in a simplified example of an edge device, gateway, and cloud service, it will be understood that many variations of these configurations may be used with the presently disclosed techniques. Accordingly, the following sections discuss implementation examples of internet-of-things (IoT) network topologies and device communication and operations, which may be used with the presently disclosed AI inference service management and operation techniques.

Figure 6:
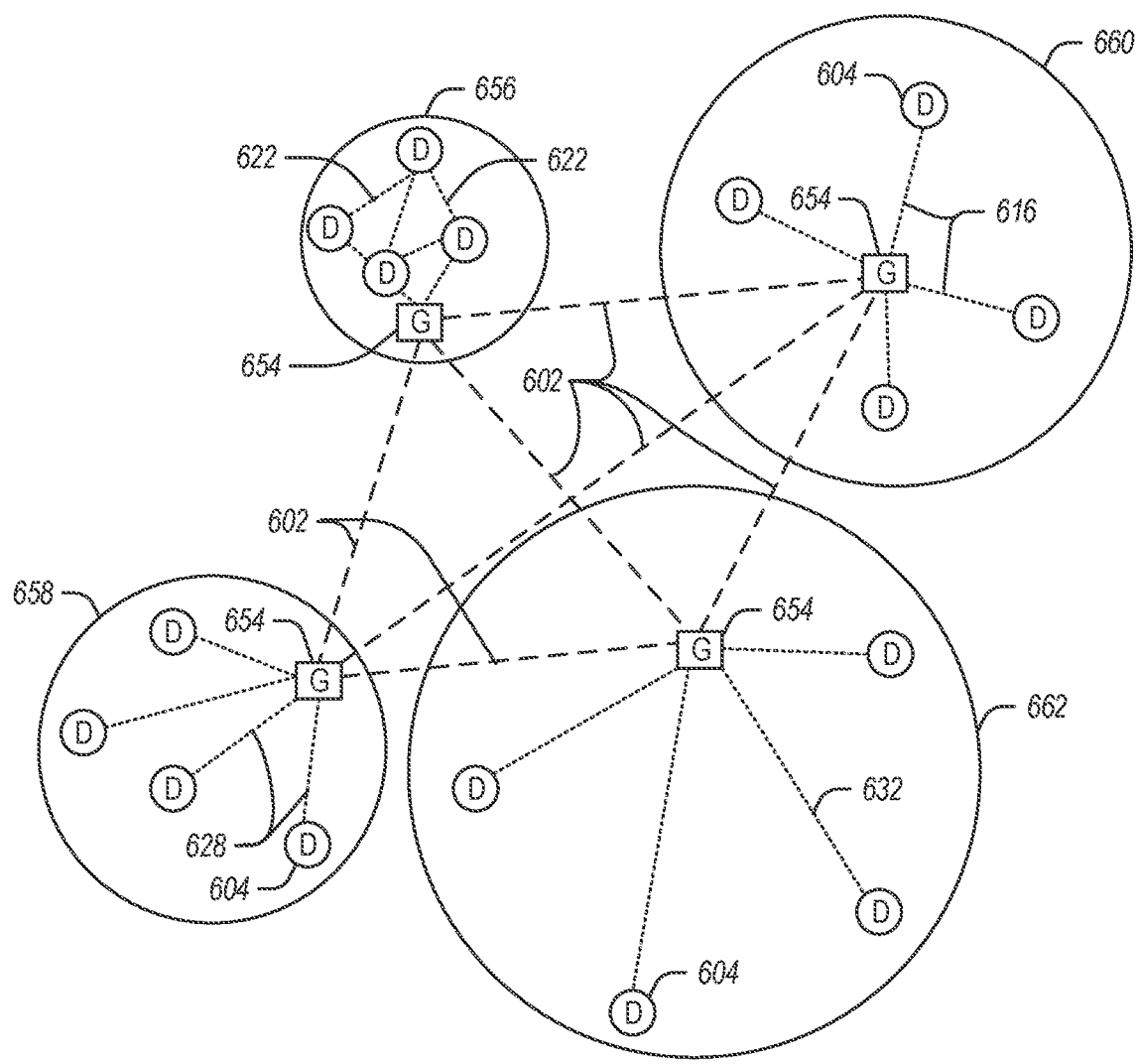
FIG. 6 illustrates a domain topology for respective internet-of-things (IoT) networks coupled through links to respective gateways, according to an example.

FIG. 6 illustrates an example domain topology for respective IoT networks coupled through links to respective gateways. The IoT is a concept in which a large number of computing devices are interconnected to each other and to the Internet to provide functionality and data acquisition at very low levels. Thus, as used herein, an IoT device may include a semiautonomous device (e.g., a client edge device, as discussed in the examples above) performing a function, such as sensing or control, among others, in communication with other IoT devices and a wider network, such as the Internet.

Often, IoT devices are limited in memory, size, or functionality, allowing larger numbers to be deployed for a similar cost to smaller numbers of larger devices. However, an IoT device may be a smart phone, laptop, tablet, or PC, or other larger device. Further, an IoT device may be a virtual device, such as an application on a smart phone or other computing device. IoT devices may include IoT gateways, used to couple IoT devices to other IoT devices and to cloud applications, for data storage, process control, and the like.

Networks of IoT devices may include commercial and home automation devices, such as water distribution systems, electric power distribution systems, pipeline control systems, plant control systems, light switches, thermostats, locks, cameras, alarms, motion sensors, and the like. The IoT devices may be accessible through remote computers, servers, and other systems, for example, to control systems or access data.

The future growth of the Internet and like networks may involve very large numbers of IoT devices. Accordingly, in the context of the techniques discussed herein, a number of innovations for such future networking will address the need for all these layers to grow unhindered, to discover and make accessible connected resources, and to support the ability to hide and compartmentalize connected resources. Any number of network protocols and communications standards may be used, wherein each protocol and standard is designed to address specific objectives. Further, the protocols are part of the fabric supporting human accessible services that operate regardless of location, time or space. The innovations include service delivery and associated infrastructure, such as hardware and software; security enhancements; and the provision of services based on Quality of Service (QoS) terms specified in service level and service delivery agreements. As will be understood, the use of IoT devices and networks, such as with the configurations referenced in FIGS. 6 to 9, present a number of new challenges in a heterogeneous network of connectivity comprising a combination of wired and wireless technologies.

FIG. 6 specifically provides a simplified drawing of a domain topology that may be used for a number of internet-of-things (IoT) networks comprising IoT devices 604, with the IoT networks 656, 658, 660, 662, coupled through backbone links 602 to respective gateways 654. For example, a number of IoT devices 604 may communicate with a gateway 654, and with each other through the gateway 654. To simplify the drawing, not every IoT device 604, or communications link (e.g., link 616, 622, 628, or 632) is labeled. The backbone links 602 may include any number of wired or wireless technologies, including optical networks, and may be part of a local area network (LAN), a wide area network (WAN), or the Internet. Additionally, such communication links facilitate optical signal paths among both IoT devices 604 and gateways 654, including the use of MUXing/deMUXing components that facilitate interconnection of the various devices.

The network topology may include any number of types of IoT networks, such as a mesh network provided with the network 656 using Bluetooth low energy (BLE) links 622. Other types of IoT networks that may be present include a wireless local area network (WLAN) network 658 used to communicate with IoT devices 604 through IEEE 802.11 (Wi-Fi®) links 628, a cellular network 660 used to communicate with IoT devices 604 through an LTE/LTE-A (4G) or 5G cellular network, and a low-power wide area (LPWA) network 662, for example, a LPWA network compatible with the LoRaWan specification promulgated by the LoRa alliance, or a IPv6 over Low Power Wide-Area Networks (LPWAN) network compatible with a specification promulgated by the Internet Engineering Task Force (IETF). Further, the respective IoT networks may communicate with an outside network provider (e.g., a tier 2 or tier 3 provider) using any number of communications links, such as an LTE cellular link, an LPWA link, or a link based on the IEEE 802.15.4 standard, such as Zigbee®. The respective IoT networks may also operate with use of a variety of network and internet application protocols such as Constrained Application Protocol (CoAP). The respective IoT networks may also be integrated with coordinator devices that provide a chain of links that forms cluster tree of linked devices and networks.

Each of these IoT networks may provide opportunities for new technical features, such as those as described herein. The improved technologies and networks may enable the exponential growth of devices and networks, including the use of IoT networks into as fog devices or systems. As the use of such improved technologies grows, the IoT networks may be developed for self-management, functional evolution, and collaboration, without needing direct human intervention. The improved technologies may even enable IoT networks to function without centralized controlled systems. Accordingly, the improved technologies described herein may be used to automate and enhance network management and operation functions far beyond current implementations.

In an example, communications between IoT devices 604, such as over the backbone links 602, may be protected by a decentralized system for authentication, authorization, and accounting (AAA). In a decentralized AAA system, distributed payment, credit, audit, authorization, and authentication systems may be implemented across interconnected heterogeneous network infrastructure. This allows systems and networks to move towards autonomous operations. In these types of autonomous operations, machines may even contract for human resources and negotiate partnerships with other machine networks. This may allow the achievement of mutual objectives and balanced service delivery against outlined, planned service level agreements as well as achieve solutions that provide metering, measurements, traceability and trackability. The creation of new supply chain structures and methods may enable a multitude of services to be created, mined for value, and collapsed without any human involvement.

Such IoT networks may be further enhanced by the integration of sensing technologies, such as sound, light, electronic traffic, facial and pattern recognition, smell, vibration, into the autonomous organizations among the IoT devices. The integration of sensory systems may allow systematic and autonomous communication and coordination of service delivery against contractual service objectives, orchestration and quality of service (QoS) based swarming and fusion of resources. Some of the individual examples of network-based resource processing include the following.

The mesh network 656, for instance, may be enhanced by systems that perform inline data-to-information transforms. For example, self-forming chains of processing resources comprising a multi-link network may distribute the transformation of raw data to information in an efficient manner, and the ability to differentiate between assets and resources and the associated management of each. Furthermore, the proper components of infrastructure and resource based trust and service indices may be inserted to improve the data integrity, quality, assurance and deliver a metric of data confidence.

The WLAN network 658, for instance, may use systems that perform standards conversion to provide multi-standard connectivity, enabling IoT devices 604 using different protocols to communicate. Further systems may provide seamless interconnectivity across a multi-standard infrastructure comprising visible Internet resources and hidden Internet resources.

Communications in the cellular network 660, for instance, may be enhanced by systems that offload data, extend communications to more remote devices, or both. The LPWA network 662 may include systems that perform non-Internet protocol (IP) to IP interconnections, addressing, and routing. Further, each of the IoT devices 604 may include the appropriate transceiver for wide area communications with that device. Further, each IoT device 604 may include other transceivers for communications using additional protocols and frequencies. This is discussed further with respect to the communication environment and hardware of an IoT processing device depicted in FIGS. 8 and 9.

Finally, clusters of IoT devices may be equipped to communicate with other IoT devices as well as with a cloud network. This may allow the IoT devices to form an ad-hoc network between the devices, allowing them to function as a single device, which may be termed a fog device. This configuration is discussed further with respect to FIG. 7 below.

Figure 7:
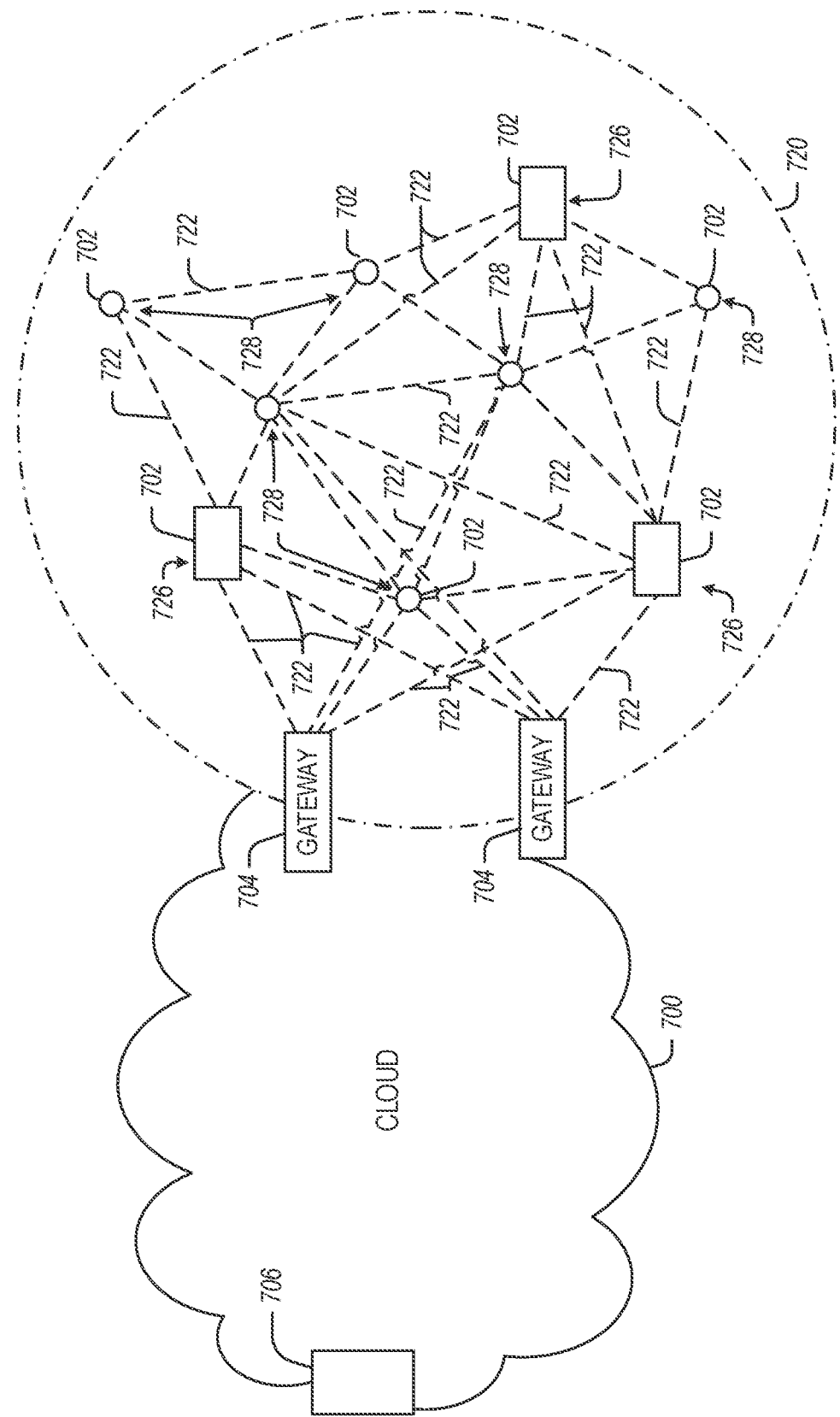
FIG. 7 illustrates a cloud computing network in communication with a mesh network of IoT devices operating as a fog device at the edge of the cloud computing network, according to an example.

FIG. 7 illustrates a cloud computing network in communication with a mesh network of IoT devices (devices 702) operating as a fog device at the edge of the cloud computing network. The mesh network of IoT devices may be termed a fog 720, operating at the edge of the cloud 700. To simplify the diagram, not every IoT device 702 is labeled.

The fog 720 may be considered to be a massively interconnected network wherein a number of IoT devices 702 are in communications with each other, for example, by radio links 722. As an example, this interconnected network may be facilitated using an interconnect specification released by the Open Connectivity Foundation™ (OCF). This standard allows devices to discover each other and establish communications for interconnects. Other interconnection protocols may also be used, including, for example, the optimized link state routing (OLSR) Protocol, the better approach to mobile ad-hoc networking (B.A.T.M.A.N.) routing protocol, or the OMA Lightweight M2M (LWM2M) protocol, among others.

Three types of IoT devices 702 are shown in this example, gateways 704, data aggregators 726, and sensors 728, although any combinations of IoT devices 702 and functionality may be used. The gateways 704 may be edge devices that provide communications between the cloud 700 and the fog 720, and may also provide the backend process function for data obtained from sensors 728, such as motion data, flow data, temperature data, and the like. The data aggregators 726 may collect data from any number of the sensors 728, and perform the back end processing function for the analysis. The results, raw data, or both may be passed along to the cloud 700 through the gateways 704. The sensors 728 may be full IoT devices 702, for example, capable of both collecting data and processing the data. In some cases, the sensors 728 may be more limited in functionality, for example, collecting the data and allowing the data aggregators 726 or gateways 704 to process the data.

Communications from any IoT device 702 may be passed along a convenient path (e.g., a most convenient path) between any of the IoT devices 702 to reach the gateways 704. In these networks, the number of interconnections provide substantial redundancy, allowing communications to be maintained, even with the loss of a number of IoT devices 702. Further, the use of a mesh network may allow IoT devices 702 that are very low power or located at a distance from infrastructure to be used, as the range to connect to another IoT device 702 may be much less than the range to connect to the gateways 704.

The fog 720 provided from these IoT devices 702 may be presented to devices in the cloud 700, such as a server 706, as a single device located at the edge of the cloud 700, e.g., a fog device. In this example, the alerts coming from the fog device may be sent without being identified as coming from a specific IoT device 702 within the fog 720. In this fashion, the fog 720 may be considered a distributed platform that provides computing and storage resources to perform processing or data-intensive tasks such as data analytics, data aggregation, and machine-learning, among others.

In some examples, the IoT devices 702 may be configured using an imperative programming style, e.g., with each IoT device 702 having a specific function and communication partners. However, the IoT devices 702 forming the fog device may be configured in a declarative programming style, allowing the IoT devices 702 to reconfigure their operations and communications, such as to determine needed resources in response to conditions, queries, and device failures. As an example, a query from a user located at a server 706 about the operations of a subset of equipment monitored by the IoT devices 702 may result in the fog 720 device selecting the IoT devices 702, such as particular sensors 728, needed to answer the query. The data from these sensors 728 may then be aggregated and analyzed by any combination of the sensors 728, data aggregators 726, or gateways 704, before being sent on by the fog 720 device to the server 706 to answer the query. In this example, IoT devices 702 in the fog 720 may select the sensors 728 used based on the query, such as adding data from flow sensors or temperature sensors. Further, if some of the IoT devices 702 are not operational, other IoT devices 702 in the fog 720 device may provide analogous data, if available.

In an example, the operations and functionality described above with reference to FIGS. 1 to 5 may be embodied by an IoT device machine in the example form of an electronic processing system, within which a set or sequence of instructions may be executed to cause the electronic processing system to perform any one of the methodologies discussed herein, according to an example embodiment. The machine may be an IoT device or an IoT gateway, including a machine embodied by aspects of a personal computer (PC), a tablet PC, a personal digital assistant (PDA), a mobile telephone or smartphone, or any machine capable of executing instructions (sequential or otherwise) that specify actions to be taken by that machine. Further, while only a single machine may be depicted and referenced in the example above, such machine shall also be taken to include any collection of machines that individually or jointly execute a set (or multiple sets) of instructions to perform any one or more of the methodologies discussed herein. Further, these and like examples to a processor-based system shall be taken to include any set of one or more machines that are controlled by or operated by a processor (e.g., a computer) to individually or jointly execute instructions to perform any one or more of the methodologies discussed herein.

Figure 8:
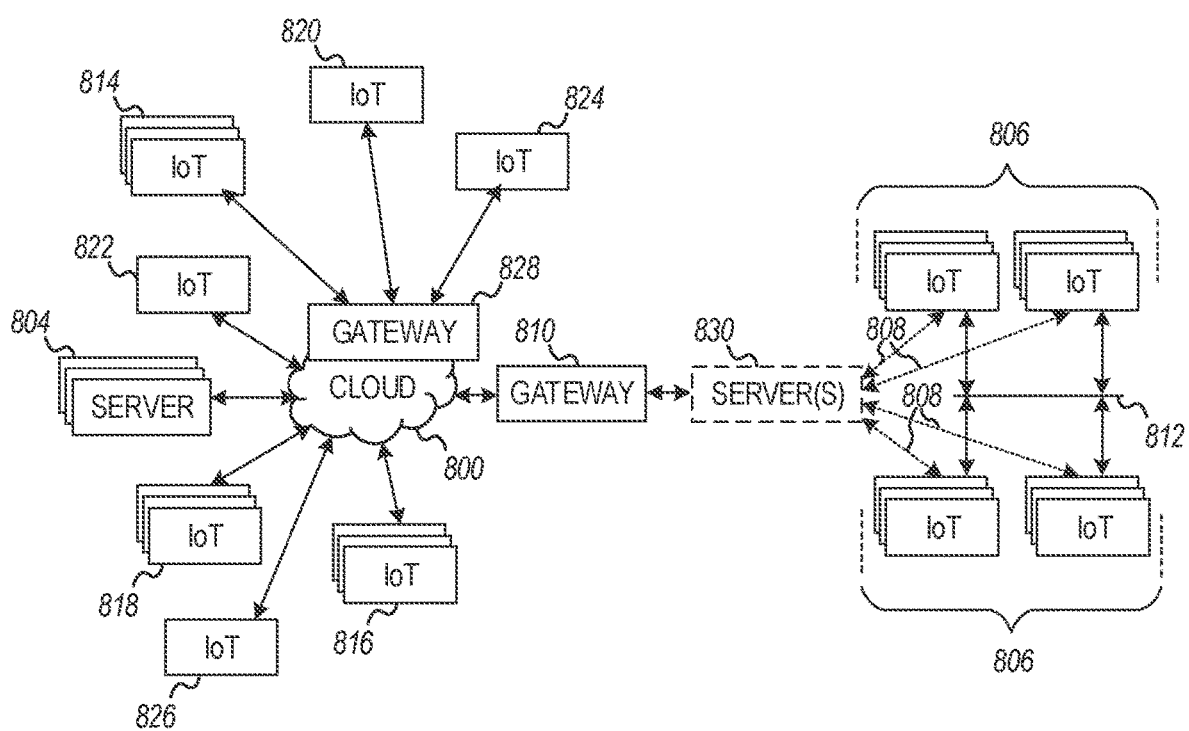
FIG. 8 illustrates a block diagram of a network illustrating communications among a number of IoT devices, according to an example.

FIG. 8 illustrates a drawing of a cloud computing network, or cloud 800, in communication with a number of Internet of Things (IoT) devices. The cloud 800 may represent the Internet, or may be a local area network (LAN), or a wide area network (WAN), such as a proprietary network for a company. The IoT devices may include any number of different types of devices, grouped in various combinations. For example, a traffic control group 806 may include IoT devices along streets in a city. These IoT devices may include stoplights, traffic flow monitors, cameras, weather sensors, and the like. The traffic control group 806, or other subgroups, may be in communication with the cloud 800 through wired or wireless links 808, such as LPWA links, optical links, and the like. Further, a wired or wireless sub-network 812 may allow the IoT devices to communicate with each other, such as through a local area network, a wireless local area network, and the like. The IoT devices may use another device, such as a gateway 810 or 828 to communicate with remote locations such as the cloud 800; the IoT devices may also use one or more servers 830 to facilitate communication with the cloud 800 or with the gateway 810. For example, the one or more servers 830 may operate as an intermediate network node to support a local edge cloud or fog implementation among a local area network. Further, the gateway 828 that is depicted may operate in a cloud-to-gateway-to-many edge devices configuration, such as with the various IoT devices 814, 820, 824 being constrained or dynamic to an assignment and use of resources in the cloud 800.

Other example groups of IoT devices may include remote weather stations 814, local information terminals 816, alarm systems 818, automated teller machines 820, alarm panels 822, or moving vehicles, such as emergency vehicles 824 or other vehicles 826, among many others. Each of these IoT devices may be in communication with other IoT devices, with servers 804, with another IoT fog device or system (not shown, but depicted in FIG. 7), or a combination therein. The groups of IoT devices may be deployed in various residential, commercial, and industrial settings (including in both private or public environments).

As may be seen from FIG. 8, a large number of IoT devices may be communicating through the cloud 800. This may allow different IoT devices to request or provide information to other devices autonomously. For example, a group of IoT devices (e.g., the traffic control group 806) may request a current weather forecast from a group of remote weather stations 814, which may provide the forecast without human intervention. Further, an emergency vehicle 824 may be alerted by an automated teller machine 820 that a burglary is in progress. As the emergency vehicle 824 proceeds towards the automated teller machine 820, it may access the traffic control group 806 to request clearance to the location, for example, by lights turning red to block cross traffic at an intersection in sufficient time for the emergency vehicle 824 to have unimpeded access to the intersection.

Clusters of IoT devices, such as the remote weather stations 814 or the traffic control group 806, may be equipped to communicate with other IoT devices as well as with the cloud 800. This may allow the IoT devices to form an ad-hoc network between the devices, allowing them to function as a single device, which may be termed a fog device or system (e.g., as described above with reference to FIG. 7).

Figure 9:
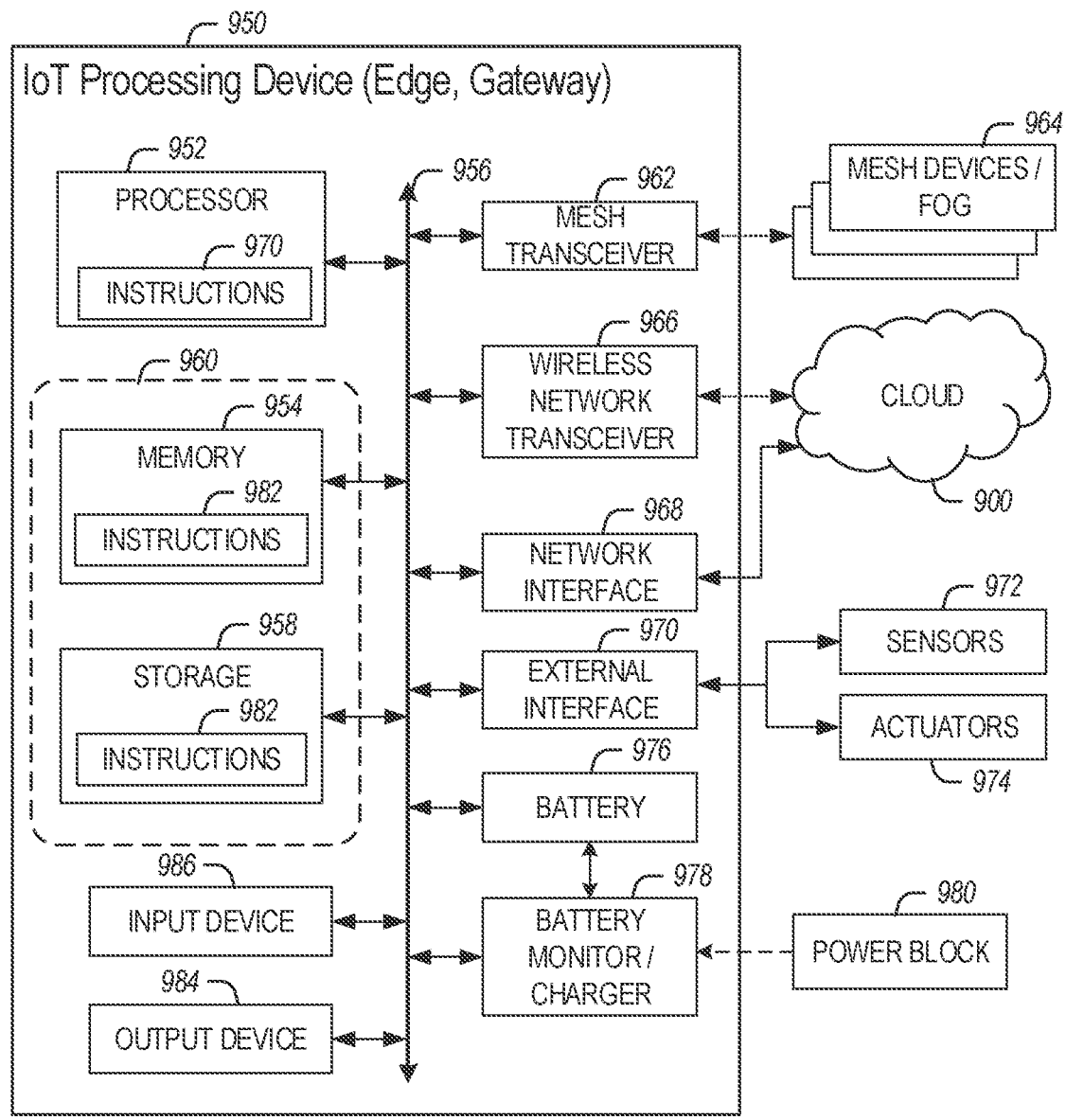
FIG. 9 illustrates a block diagram for an example IoT device processing system architecture upon which any one or more of the techniques (e.g., operations, processes, methods, and methodologies) discussed herein may be performed, according to an example.

FIG. 9 is a block diagram of an example of components that may be present in an IoT device 950 (e.g., an edge device, or gateway device) for implementing the techniques described herein. The IoT device 950 may include any combinations of the components shown in the example or referenced in the disclosure above. The components may be implemented as ICs, portions thereof, discrete electronic devices, or other modules, logic, hardware, software, firmware, or a combination thereof adapted in the IoT device 950, or as components otherwise incorporated within a chassis of a larger system. Additionally, the block diagram of FIG. 9 is intended to depict a high-level view of components of the IoT device 950. However, some of the components shown may be omitted, additional components may be present, and different arrangement of the components shown may occur in other implementations.

The IoT device 950 may include a processor 952, which may be a microprocessor, a multi-core processor, a multi-threaded processor, an ultra-low voltage processor, an embedded processor, or other known processing element. The processor 952 may be a part of a system on a chip (SoC) in which the processor 952 and other components are formed into a single integrated circuit, or a single package, such as the Edison™ or Galileo™ SoC boards from Intel. As an example, the processor 952 may include an Intel® Architecture Core™ based processor, such as a Quark™, an Atom™, an i3, an i5, an i7, or an MCU-class processor, or another such processor available from Intel® Corporation, Santa Clara, Calif. However, any number other processors may be used, such as available from Advanced Micro Devices, Inc. (AMD) of Sunnyvale, Calif., a MIPS-based design from MIPS Technologies, Inc. of Sunnyvale, Calif., an ARM-based design licensed from ARM Holdings, Ltd. or customer thereof, or their licensees or adopters. The processors may include units such as an A5-A7 processor from Apple® Inc., a Snapdragon™ processor from Qualcomm® Technologies, Inc., or an OMAP™ processor from Texas Instruments, Inc.

The processor 952 may communicate with a system memory 954 over an interconnect 956 (e.g., a bus). Any number of memory devices may be used to provide for a given amount of system memory. As examples, the memory may be random access memory (RAM) in accordance with a Joint Electron Devices Engineering Council (JEDEC) design such as the DDR or mobile DDR standards (e.g., LPDDR, LPDDR2, LPDDR3, or LPDDR4). In various implementations the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 958 may also couple to the processor 952 via the interconnect 956. In an example the storage 958 may be implemented via a solid state disk drive (SSDD). Other devices that may be used for the storage 958 include flash memory cards, such as SD cards, microSD cards, xD picture cards, and the like, and USB flash drives. In low power implementations, the storage 958 may be on-die memory or registers associated with the processor 952. However, in some examples, the storage 958 may be implemented using a micro hard disk drive (HDD). Further, any number of new technologies may be used for the storage 958 in addition to, or instead of, the technologies described, such resistance change memories, phase change memories, holographic memories, or chemical memories, among others.

The components may communicate over the interconnect 956. The interconnect 956 may include any number of technologies, including industry standard architecture (ISA), extended ISA (EISA), peripheral component interconnect (PCI), peripheral component interconnect extended (PCIx), PCI express (PCIe), or any number of other technologies. The interconnect 956 may be a proprietary bus, for example, used in a SoC based system. Other bus systems may be included, such as an I2C interface, an SPI interface, point to point interfaces, and a power bus, among others.

The interconnect 956 may couple the processor 952 to a mesh transceiver 962, for communications with other mesh devices 964. The mesh transceiver 962 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the mesh devices 964. For example, a WLAN unit may be used to implement Wi-Fi™ communications in accordance with the Institute of Electrical and Electronics Engineers (IEEE) 802.11 standard. In addition, wireless wide area communications, e.g., according to a cellular or other wireless wide area protocol, may occur via a WWAN unit.

The mesh transceiver 962 may communicate using multiple standards or radios for communications at different range. For example, the IoT device 950 may communicate with close devices, e.g., within about 10 meters, using a local transceiver based on BLE, or another low power radio, to save power. More distant mesh devices 964, e.g., within about 50 meters, may be reached over ZigBee or other intermediate power radios. Both communications techniques may take place over a single radio at different power levels, or may take place over separate transceivers, for example, a local transceiver using BLE and a separate mesh transceiver using ZigBee.

A wireless network transceiver 966 may be included to communicate with devices or services in the cloud 900 via local or wide area network protocols. The wireless network transceiver 966 may be a LPWA transceiver that follows the IEEE 802.15.4, or IEEE 802.15.4g standards, among others. The IoT device 950 may communicate over a wide area using LoRaWAN™ (Long Range Wide Area Network) developed by Semtech and the LoRa Alliance. The techniques described herein are not limited to these technologies, but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the mesh transceiver 962 and wireless network transceiver 966, as described herein. For example, the radio transceivers 962 and 966 may include an LTE or other cellular transceiver that uses spread spectrum (SPA/SAS) communications for implementing high speed communications. Further, any number of other protocols may be used, such as Wi-Fi® networks for medium speed communications and provision of network communications.

The radio transceivers 962 and 966 may include radios that are compatible with any number of 3GPP (Third Generation Partnership Project) specifications, notably Long Term Evolution (LTE), Long Term Evolution-Advanced (LTE-A), and Long Term Evolution-Advanced Pro (LTE-A Pro). It may be noted that radios compatible with any number of other fixed, mobile, or satellite communication technologies and standards may be selected. These may include, for example, any Cellular Wide Area radio communication technology, which may include e.g. a 5th Generation (5G) communication systems, a Global System for Mobile Communications (GSM) radio communication technology, a General Packet Radio Service (GPRS) radio communication technology, or an Enhanced Data Rates for GSM Evolution (EDGE) radio communication technology, a UMTS (Universal Mobile Telecommunications System) communication technology, In addition to the standards listed above, any number of satellite uplink technologies may be used for the wireless network transceiver 966, including, for example, radios compliant with standards issued by the ITU (International Telecommunication Union), or the ETSI (European Telecommunications Standards Institute), among others. The examples provided herein are thus understood as being applicable to various other communication technologies, both existing and not yet formulated.

A network interface controller (NIC) 968 may be included to provide a wired communication to the cloud 900 or to other devices, such as the mesh devices 964. The wired communication may provide an Ethernet connection, or may be based on other types of networks, such as Controller Area Network (CAN), Local Interconnect Network (LIN), DeviceNet, ControlNet, Data Highway+, PROFIBUS, or PROFINET, among many others. An additional NIC 968 may be included to allow connect to a second network, for example, a NIC 968 providing communications to the cloud over Ethernet, and a second NIC 968 providing communications to other devices over another type of network.

The interconnect 956 may couple the processor 952 to an external interface 970 that is used to connect external devices or subsystems. The external devices may include sensors 972, such as accelerometers, level sensors, flow sensors, optical light sensors, camera sensors, temperature sensors, a global positioning system (GPS) sensors, pressure sensors, barometric pressure sensors, and the like. The external interface 970 further may be used to connect the IoT device 950 to actuators 974, such as power switches, valve actuators, an audible sound generator, a visual warning device, and the like.

In some optional examples, various input/output (I/O) devices may be present within, or connected to, the IoT device 950. For example, a display or other output device 984 may be included to show information, such as sensor readings or actuator position. An input device 986, such as a touch screen or keypad may be included to accept input. An output device 984 may include any number of forms of audio or visual display, including simple visual outputs such as binary status indicators (e.g., LEDs) and multi-character visual outputs, or more complex outputs such as display screens (e.g., LCD screens), with the output of characters, graphics, multimedia objects, and the like being generated or produced from the operation of the IoT device 950.

A battery 976 may power the IoT device 950, although in examples in which the IoT device 950 is mounted in a fixed location, it may have a power supply coupled to an electrical grid. The battery 976 may be a lithium ion battery, or a metal-air battery, such as a zinc-air battery, an aluminum-air battery, a lithium-air battery, and the like.

A battery monitor/charger 978 may be included in the IoT device 950 to track the state of charge (SoCh) of the battery 976. The battery monitor/charger 978 may be used to monitor other parameters of the battery 976 to provide failure predictions, such as the state of health (SoH) and the state of function (SoF) of the battery 976. The battery monitor/charger 978 may include a battery monitoring integrated circuit, such as an LTC4020 or an LTC2990 from Linear Technologies, an ADT7488A from ON Semiconductor of Phoenix Ariz., or an IC from the UCD90xxx family from Texas Instruments of Dallas, Tex. The battery monitor/charger 978 may communicate the information on the battery 976 to the processor 952 over the interconnect 956. The battery monitor/charger 978 may also include an analog-to-digital (ADC) convertor that allows the processor 952 to directly monitor the voltage of the battery 976 or the current flow from the battery 976. The battery parameters may be used to determine actions that the IoT device 950 may perform, such as transmission frequency, mesh network operation, sensing frequency, and the like.

A power block 980, or other power supply coupled to a grid, may be coupled with the battery monitor/charger 978 to charge the battery 976. In some examples, the power block 980 may be replaced with a wireless power receiver to obtain the power wirelessly, for example, through a loop antenna in the IoT device 950. A wireless battery charging circuit, such as an LTC4020 chip from Linear Technologies of Milpitas, Calif., among others, may be included in the battery monitor/charger 978. The specific charging circuits chosen depend on the size of the battery 976, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 958 may include instructions 982 in the form of software, firmware, or hardware commands to implement the techniques described herein. Although such instructions 982 are shown as code blocks included in the memory 954 and the storage 958, it may be understood that any of the code blocks may be replaced with hardwired circuits, for example, built into an application specific integrated circuit (ASIC).

In an example, the instructions 982 provided via the memory 954, the storage 958, or the processor 952 may be embodied as a non-transitory, machine readable medium 960 including code to direct the processor 952 to perform electronic operations in the IoT device 950. The processor 952 may access the non-transitory, machine readable medium 960 over the interconnect 956. For instance, the non-transitory, machine readable medium 960 may be embodied by devices described for the storage 958 of FIG. 9 or may include specific storage units such as optical disks, flash drives, or any number of other hardware devices. The non-transitory, machine readable medium 960 may include instructions to direct the processor 952 to perform a specific sequence or flow of actions, for example, as described with respect to the flowchart(s) and block diagram(s) of operations and functionality depicted above.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include, but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., HTTP).

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together, but may comprise disparate instructions stored in different locations which, when joined logically together, comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center), than that in which the code is deployed (e.g., in a computer embedded in a sensor or robot). Similarly, operational data may be identified and illustrated herein within components or modules, and may be embodied in any suitable form and organized within any suitable type of data structure. The operational data may be collected as a single data set, or may be distributed over different locations including over different storage devices, and may exist, at least partially, merely as electronic signals on a system or network. The components or modules may be passive or active, including agents operable to perform desired functions.

Additional examples of the presently described method, system, and device embodiments are suggested according to the structures and techniques described above, and specified in the following examples and claims.

Example 1 is a method for processing contextualized AI inferencing, comprising a plurality of operations executed with a processor and memory of a computing device, with the operations comprising: receiving, from an edge device, a request for an artificial intelligence (AI) inferencing operation, wherein the request includes, data to conduct the inferencing operation, the data including: a specification of an AI inferencing model, and contextual data; selecting an implementation of the AI inferencing model from among a plurality of implementations of the AI inferencing model based on the specification and the contextual data, wherein the implementations operate on respective hardware configurations at a remote computing system; and initiating an execution of the selected implementation of the AI inferencing model, wherein inferencing results from the execution of the selected implementation of the AI inferencing model are provided to the edge device.

In Example 2, the subject matter of Example 1 includes, wherein the implementation of the AI inferencing model is selected from among the plurality of implementations of the AI inferencing model based on a variation of the AI inferencing model, wherein at least two variations of the AI inferencing model exist within a respective hardware configuration in the remote computing system, and wherein the at least two variations of the AI inferencing model are respectively customized to different data inputs provided in the contextual data.

In Example 3, the subject matter of Examples 1-2 includes, wherein the contextual data for the AI inferencing operation is produced based on an operational environment of the edge device, and wherein the contextual data indicates at least one of: condition of a network connection with the edge device, sensor data collected from a sensor operably coupled to the edge device, or pre-processed data generated by the edge device.

In Example 4, the subject matter of Examples 1-3 includes, wherein the contextual data includes sensor data combined from a plurality of sensors in communication with the edge device, wherein the combined sensor data is considered in selecting the implementation of the AI inferencing model, and wherein the combined sensor data is provided as an input in the selected implementation of the AI inferencing model.

In Example 5, the subject matter of Examples 1-4 includes, the operations further comprising: registering a plurality of distinct AI inferencing models, wherein registering the distinct AI inferencing models includes establishing a mapping of a model identifier of the AI inferencing model to a respective hardware configuration used in the remote computing system; wherein the specification of the AI inferencing model indicates the model identifier.

In Example 6, the subject matter of Examples 1-5 includes, the operations further comprising: registering the specification of the AI inferencing model to be associated with a data set or a set of sensors of the edge device; wherein selecting the implementation of the AI inferencing model is performed subsequent to registering the specification of the AI inferencing model.

In Example 7, the subject matter of Examples 1-6 includes, wherein selecting the implementation of the AI inferencing model is based at least in part on time-adaptive characteristics of the execution of the selected implementation at the remote computing system, and wherein the respective implementations of the AI inferencing model are invoked at respective times.

In Example 8, the subject matter of Examples 1-7 includes, wherein the remote computing system is a cloud service hosted by a plurality of servers, wherein the cloud service hosts the respective hardware configurations among a plurality of hardware platforms, and wherein the respective hardware configurations of the cloud service include at least one server appliance system and at least one field-programmable gate array (FPGA) configured to execute at least a portion of the implementation of the AI inferencing model.

In Example 9, the subject matter of Examples 1-8 includes, wherein the computing device is a switch or gateway located between the edge device and the remote computing system; and wherein the computing device is adapted to process requests for a plurality of edge devices including the edge device, wherein the plurality of edge devices are connected to the computing device via an Internet of Things (IoT) network topology.

Example 10 is at least one machine readable medium including instructions, which when executed by a computing system, cause the computing system to perform any of the methods of Examples 1-9.

Example 11 is an apparatus comprising means for performing any of the methods of Examples 1-9.

Example 12 is a gateway computing device adapted for processing contextualized AI inferencing, the gateway computing device comprising: communication circuitry to: receive, from an edge device, a request for an artificial intelligence (AI) inferencing operation, wherein the request includes, data to conduct the AI inferencing operation, the data including: a specification of an AI inferencing model, and contextual data; transmit, to a remote computing system, a request to execute a selected implementation of the AI inferencing model; processing circuitry to: process the request for the AI inferencing operation; select, from the remote computing system in response to the request, an implementation of the AI inferencing model from among a plurality of implementations of the AI inferencing model based on the specification and the contextual data, wherein the implementations operate on respective hardware configurations at the remote computing system; and initiate execution of the selected implementation of the AI inferencing model, wherein inferencing results from the execution of the selected implementation of the AI inferencing model are provided to the edge device; wherein the gateway computing device is connected via a network to the edge device and the remote computing system.

In Example 13, the subject matter of Example 12 includes, wherein the implementation of the AI inferencing model is selected from among the plurality of implementations of the AI inferencing model based on a variation of the AI inferencing model, wherein at least two variations of the AI inferencing model exist within a respective hardware configuration in the remote computing system, and wherein the at least two variations of the AI inferencing model are respectively customized to different data inputs provided in the contextual data.

In Example 14, the subject matter of Examples 12-13 includes, wherein the contextual data for the AI inferencing operation is produced based on an operational environment of the edge device, and wherein the contextual data indicates at least one of: condition of a network connection with the edge device, sensor data collected from a sensor operably coupled to the edge device, or pre-processed data generated by the edge device.

In Example 15, the subject matter of Examples 12-14 includes, wherein the contextual data includes sensor data combined from a plurality of sensors in communication with the edge device, wherein the combined sensor data is considered in selecting the implementation of the AI inferencing model, and wherein the combined sensor data is provided as an input in the selected implementation of the AI inferencing model.

In Example 16, the subject matter of Examples 12-15 includes, the processing circuitry further to: register a plurality of distinct AI inferencing models, wherein operations to register the distinct AI inferencing models includes establishment of a mapping of a model identifier of the AI inferencing model to a respective hardware configuration used in the remote computing system; wherein the specification of the AI inferencing model indicates the model identifier.

In Example 17, the subject matter of Examples 12-16 includes, the processing circuitry further to: register the specification of the AI inferencing model, to associate the specification with a data set or a set of sensors of the edge device; wherein selection of the implementation of the AI inferencing model is performed subsequent to registration of the specification of the AI inferencing model.

In Example 18, the subject matter of Examples 12-17 includes, wherein selection of the implementation of the AI inferencing model is based at least in part on time-adaptive characteristics of the execution of the selected implementation at the remote computing system, and wherein the respective implementations of the AI inferencing model are invoked at respective times.

In Example 19, the subject matter of Examples 12-18 includes, wherein the remote computing system is a cloud service hosted by a plurality of servers, wherein the cloud service hosts the respective hardware configurations among a plurality of hardware platforms, and wherein the respective hardware configurations of the cloud service include at least one server appliance system and at least one field-programmable gate array (FPGA) configured to execute at least a portion of the implementation of the AI inferencing model.

Example 20 is at least one machine readable storage medium, comprising a plurality of instructions adapted for processing contextualized AI inferencing, wherein the instructions, responsive to being executed with processor circuitry of a computing machine, cause the processor circuitry to perform operations comprising: receiving, from an edge device, a request for an artificial intelligence (AI) inferencing operation, wherein the request includes, data to conduct the AI inferencing operation, the data including: a specification of an AI inferencing model, and contextual data; selecting an implementation of the AI inferencing model from among a plurality of implementations of the AI inferencing model based on the specification and the contextual data, wherein the implementations operate on respective hardware configurations at a remote computing system; and initiating execution of the selected implementation of the AI inferencing model, wherein inferencing results from the execution of the selected implementation of the AI inferencing model are provided to the edge device.

In Example 21, the subject matter of Example 20 includes, wherein the implementation of the AI inferencing model is selected from among the plurality of implementations of the AI inferencing model based on a variation of the AI inferencing model, wherein at least two variations of the AI inferencing model exist within a respective hardware configuration in the remote computing system, and wherein the at least two variations of the AI inferencing model are respectively customized to different data inputs provided in the contextual data.

In Example 22, the subject matter of Examples 20-21 includes, wherein the contextual data for the AI inferencing operation is produced based on an operational environment of the edge device, and wherein the contextual data indicates at least one of: condition of a network connection with the edge device, sensor data collected from a sensor operably coupled to the edge device, or pre-processed data generated by the edge device.

In Example 23, the subject matter of Examples 20-22 includes, the operations further comprising: wherein the contextual data includes sensor data combined from a plurality of sensors in communication with the edge device, wherein the combined sensor data is considered in selecting the implementation of the AI inferencing model, and wherein the combined sensor data is provided as an input in the selected implementation of the AI inferencing model.

In Example 24, the subject matter of Examples 20-23 includes, the operations further comprising: registering a plurality of distinct AI inferencing models, wherein registering the distinct AI inferencing models includes establishing a mapping of a model identifier of the AI inferencing model to a respective hardware configuration used in the remote computing system; wherein the specification of the AI inferencing model indicates the model identifier.

In Example 25, the subject matter of Examples 20-24 includes, the operations further comprising: registering the specification of the AI inferencing model to be associated with a data set or a set of sensors of the edge device; wherein selecting the implementation of the AI inferencing model is performed subsequent to registering the specification of the AI inferencing model.

In Example 26, the subject matter of Examples 20-25 includes, wherein selecting the implementation of the AI inferencing model is based at least in part on time-adaptive characteristics of the execution of the selected implementation at the remote computing system, and wherein the respective implementations of the AI inferencing model are invoked at respective times.

In Example 27, the subject matter of Examples 20-26 includes, the operations further comprising: wherein the remote computing system is a cloud service hosted by a plurality of servers, wherein the cloud service hosts the respective hardware configurations among a plurality of hardware platforms, and wherein the respective hardware configurations of the cloud service include at least one server appliance system and at least one field-programmable gate array (FPGA) configured to execute at least a portion of the implementation of the AI inferencing model.

Example 28 is an apparatus, comprising: means for receiving, from an edge device, a request for an artificial intelligence (AI) inferencing operation, wherein the request includes, data to conduct the AI inferencing operation, the data including: a specification of an AI inferencing model, and contextual data; means for selecting an implementation of the AI inferencing model from among a plurality of implementations of the AI inferencing model based on the specification and the contextual data, wherein the implementations operate on respective hardware configurations at a remote computing system; and means for initiating an execution of the selected implementation of the AI inferencing model, wherein inferencing results from the execution of the selected implementation of the AI inferencing model are provided to the edge device.

In Example 29, the subject matter of Example 28 includes, means for selecting an implementation of the AI inferencing model from among the plurality of implementations of the AI inferencing model based on a variation of the AI inferencing model, wherein at least two variations of the AI inferencing model exist within a respective hardware configuration in the remote computing system, and wherein the at least two variations of the AI inferencing model are respectively customized to different data inputs provided in the contextual data.

In Example 30, the subject matter of Examples 28-29 includes, means for producing the contextual data for the AI inferencing operation based on an operational environment of the edge device, wherein the contextual data indicates at least one of: condition of a network connection with the edge device, sensor data collected from a sensor operably coupled to the edge device, or pre-processed data generated by the edge device.

In Example 31, the subject matter of Examples 28-30 includes, means for obtaining the contextual data, the contextual data including sensor data combined from a plurality of sensors in communication with the edge device, wherein the combined sensor data is considered in selecting the implementation of the AI inferencing model, and wherein the combined sensor data is provided as an input in the selected implementation of the AI inferencing model.

In Example 32, the subject matter of Examples 28-31 includes, means for registering a plurality of distinct AI inferencing models, wherein registering the distinct AI inferencing models includes establishing a mapping of a model identifier of the AI inferencing model to a respective hardware configuration used in the remote computing system; wherein the specification of the AI inferencing model indicates the model identifier.

In Example 33, the subject matter of Examples 28-32 includes, means for registering the specification of the AI inferencing model to be associated with a data set or a set of sensors of the edge device; wherein selecting the implementation of the AI inferencing model is performed subsequent to registering the specification of the AI inferencing model.

In Example 34, the subject matter of Examples 28-33 includes, means for selecting the implementation of the AI inferencing model based at least in part on time-adaptive characteristics of the execution of the selected implementation at the remote computing system, wherein the respective implementations of the AI inferencing model are invoked at respective times.

In Example 35, the subject matter of Examples 28-34 includes, means for communicating with the remote computing system, wherein the remote computing system is a cloud service hosted by a plurality of servers, wherein the cloud service hosts the respective hardware configurations among a plurality of hardware platforms, and wherein the respective hardware configurations of the cloud service include at least one server appliance system and at least one field-programmable gate array (FPGA) configured to execute at least a portion of the implementation of the AI inferencing model.

In Example 36, the subject matter of Examples 28-35 includes, means for processing requests for a plurality of edge devices including the edge device, wherein the plurality of edge devices are connected to the apparatus via an Internet of Things (IoT) network topology.

Example 37 is a method for initiating contextualized AI inferencing, comprising a plurality of operations executed with a processor and memory of an edge computing device, with the operations comprising: collecting, from at least one sensor, contextual data related to an operational status of the edge computing device; generating an inference request for an artificial intelligence (AI) inferencing operation, the inference request including a specification of an AI inferencing model and the contextual data, wherein the AI inferencing model specified in the inference request is hosted by a remote cloud service; transmitting, to a gateway computing device, the inference request, wherein the gateway computing device is adapted to invoke an instance of the AI inferencing model at the remote cloud service in response to the inference request; and receiving, from the remote cloud service, a result of execution of a selected implementation of the AI inferencing model, wherein the instance of the AI inferencing model is selected by the gateway computing device based on the specification and the contextual data, and wherein the instance of the AI inferencing model operates on a specific hardware configuration of the remote cloud service.

In Example 38, the subject matter of Example 37 includes, wherein the instance of the AI inferencing model is selected from among a plurality of implementations of the AI inferencing model based on a variation of the AI inferencing model, wherein at least two variations of the AI inferencing model exist within a respective hardware configuration in the remote cloud service, and wherein the at least two variations of the AI inferencing model are respectively customized to different data inputs provided in the contextual data.

In Example 39, the subject matter of Examples 37-38 includes, wherein the contextual data for the AI inferencing operation is produced based on an operational environment of the edge computing device, and wherein the contextual data indicates at least one of: condition of a network connection from the edge computing device, sensor data collected from a sensor operable coupled to the edge computing device, or pre-processing data produced by the edge computing device.

In Example 40, the subject matter of Examples 37-39 includes, wherein the contextual data includes combined sensor data obtained from a plurality of sensors in communication with the edge computing device, wherein the combined sensor data is considered in selecting the implementation of the AI inferencing model, and wherein the combined sensor data is provided as an input in the selected implementation of the AI inferencing model.

In Example 41, the subject matter of Examples 37-40 includes, the operations further comprising: registering, between the edge computing device and the gateway computing device, a plurality of distinct AI inferencing models, wherein registering includes establishing a mapping of a model identifier of the AI inferencing model to a respective hardware configuration used in the remote cloud service; wherein the specification of the AI inferencing model indicates the model identifier.

In Example 42, the subject matter of Examples 37-41 includes, the operations further comprising: registering the specification of the AI inferencing model to be associated with a data set or a set of sensors of the edge computing device; wherein operations at the gateway computing device of selecting the implementation of the AI inferencing model are performed subsequent to registering the specification of the AI inferencing model.

In Example 43, the subject matter of Examples 37-42 includes, wherein the implementation of the AI inferencing model is selected based at least in part on time-adaptive considerations of execution of the selected implementation at the remote cloud service, and wherein respective hardware implementations of the AI inferencing model are invoked at respective times.

In Example 44, the subject matter of Examples 37-43 includes, wherein the remote cloud service includes respective hardware configurations, and wherein the respective hardware configurations of the remote cloud service include at least one server appliance system and at least one field-programmable gate array (FPGA) configured to execute at least a portion of the implementation of the AI inferencing model.

In Example 45, the subject matter of Examples 37-44 includes, wherein the edge computing device is connected to the gateway computing device via an Internet of Things (IoT) network topology.

Example 46 is at least one machine readable medium including instructions, which when executed by a computing system, cause the computing system to perform any of the methods of Examples 37-45.

Example 47 is an apparatus comprising means for performing any of the methods of Examples 37-45.

Example 48 is an edge computing device adapted for initiating contextualized AI inferencing, the edge computing device comprising: processing circuitry to: collect, from at least one sensor, contextual data related to an operational status of the edge computing device; generate a request for an artificial intelligence (AI) inferencing operation to be performed by a specified AI inferencing model, wherein the AI inferencing model specified in the request is hosted by a remote cloud service; communication circuitry to: transmit, to a gateway computing device, the request for invoking an artificial intelligence (AI) inferencing operation, wherein the request includes, data to conduct the AI inferencing operation, the data including a specification of an AI inferencing model and contextual data, and wherein the gateway computing device is adapted to invoke an instance of the inferencing operation at the remote cloud service in response to the request for the inferencing operation; receive, from a remote computing system, results from execution of a selected implementation of the AI inferencing model, wherein the selected implementation of the AI inferencing model is selected by the gateway computing device based on the specification and the contextual data, and wherein the selected implementation of the AI inferencing model operates on a specific hardware configuration of the remote computing system.

In Example 49, the subject matter of Example 48 includes, wherein the instance of the AI inferencing model is selected from among a plurality of implementations of the AI inferencing model based on a variation of the AI inferencing model, wherein at least two variations of the AI inferencing model exist within a respective hardware configuration in the remote cloud service, and wherein the at least two variations of the AI inferencing model are respectively customized to different data inputs provided in the contextual data.

In Example 50, the subject matter of Examples 48-49 includes, wherein the contextual data for the AI inferencing operation is produced based on an operational environment of the edge computing device, and wherein the contextual data indicates at least one of: condition of a network connection from the edge computing device, sensor data collected from a sensor operable coupled to the edge computing device, or pre-processing data produced by the edge computing device.

In Example 51, the subject matter of Examples 48-50 includes, wherein the contextual data includes combined sensor data obtained from a plurality of sensors in communication with the edge computing device, wherein the combined sensor data is considered in selecting the implementation of the AI inferencing model, and wherein the combined sensor data is provided as an input in the selected implementation of the AI inferencing model.

In Example 52, the subject matter of Examples 48-51 includes, the operations further comprising: registering, between the edge computing device and the gateway computing device, a plurality of distinct AI inferencing models, wherein registering includes establishing a mapping of a model identifier of the AI inferencing model to a respective hardware configuration used in the remote cloud service; wherein the specification of the AI inferencing model indicates the model identifier.

In Example 53, the subject matter of Examples 48-52 includes, the operations further comprising: registering the specification of the AI inferencing model to be associated with a data set or a set of sensors of the edge computing device; wherein operations at the gateway computing device of selecting the implementation of the AI inferencing model are performed subsequent to registering the specification of the AI inferencing model.

In Example 54, the subject matter of Examples 48-53 includes, wherein the implementation of the AI inferencing model is selected based at least in part on time-adaptive considerations of execution of the selected implementation at the remote cloud service, and wherein respective hardware implementations of the AI inferencing model are invoked at respective times.

In Example 55, the subject matter of Examples 48-54 includes, wherein the edge computing device is connected to the gateway computing device via an Internet of Things (IoT) network topology.

Example 56 is at least one machine readable storage medium, comprising a plurality of instructions adapted for initiating contextualized AI inferencing, wherein the instructions, responsive to being executed with processor circuitry of an edge computing device, cause the processor circuitry to perform operations comprising: collecting, from at least one sensor, contextual data related to an operational status of the edge computing device; generating an inference request, the inference request including a specification of an artificial intelligence (AI) inferencing model and the contextual data, wherein the AI inferencing model specified in the inference request is hosted by a remote cloud service; transmitting, to a gateway computing device, the inference request, wherein the gateway computing device is adapted to invoke an instance of the inferencing operation in response to the inference request; and receiving, from the remote cloud service, a result of execution of a selected implementation of the AI inferencing model, wherein the selected implementation of the AI inferencing model is selected by the gateway computing device based on the specification and the contextual data, and wherein the selected implementation of the AI inferencing model operates on a specific hardware configuration of the remote cloud service.

In Example 57, the subject matter of Example 56 includes, wherein the instance of the AI inferencing model is selected from among a plurality of implementations of the AI inferencing model based on a variation of the AI inferencing model, wherein at least two variations of the AI inferencing model exist within a respective hardware configuration in the remote cloud service, and wherein the at least two variations of the AI inferencing model are respectively customized to different data inputs provided in the contextual data.

In Example 58, the subject matter of Examples 56-57 includes, wherein the contextual data for the AI inferencing operation is produced based on an operational environment of the edge computing device, and wherein the contextual data indicates at least one of: condition of a network connection from the edge computing device, sensor data collected from a sensor operable coupled to the edge computing device, or pre-processing data produced by the edge computing device.

In Example 59, the subject matter of Examples 56-58 includes, wherein the contextual data includes combined sensor data obtained from a plurality of sensors in communication with the edge computing device, wherein the combined sensor data is considered in selecting the implementation of the AI inferencing model, and wherein the combined sensor data is provided as an input in the selected implementation of the AI inferencing model.

In Example 60, the subject matter of Examples 56-59 includes, the operations further comprising: registering, between the edge computing device and the gateway computing device, a plurality of distinct AI inferencing models, wherein registering includes establishing a mapping of a model identifier of the AI inferencing model to a respective hardware configuration used in the remote cloud service; wherein the specification of the AI inferencing model indicates the model identifier.

In Example 61, the subject matter of Examples 56-60 includes, the operations further comprising: registering the specification of the AI inferencing model to be associated with a data set or a set of sensors of the edge computing device; wherein operations at the gateway computing device of selecting the implementation of the AI inferencing model are performed subsequent to registering the specification of the AI inferencing model.

In Example 62, the subject matter of Examples 56-61 includes, wherein the implementation of the AI inferencing model is selected based at least in part on time-adaptive considerations of execution of the selected implementation at the remote cloud service, and wherein respective hardware implementations of the AI inferencing model are invoked at respective times.

In Example 63, the subject matter of Examples 56-62 includes, wherein the remote cloud service includes respective hardware configurations, and wherein the respective hardware configurations of the remote cloud service include at least one server appliance system and at least one field-programmable gate array (FPGA) configured to execute at least a portion of the implementation of the AI inferencing model.

In Example 64, the subject matter of Examples 56-63 includes, wherein the edge computing device is connected to the gateway computing device via an Internet of Things (IoT) network topology.

Example 65 is an apparatus, comprising: means for collecting, from at least one sensor, contextual data related to an operational status of the apparatus; means for generating an inference request for an artificial intelligence (AI) inferencing operation, the inference request including a specification of an AI inferencing model and the contextual data, wherein the AI inferencing model specified in the inference request is hosted by a remote cloud service; means for transmitting, to a gateway computing device, the inference request, wherein the gateway computing device is adapted to invoke an instance of the AI inferencing model at the remote cloud service in response to the inference request; and means for receiving, from the remote cloud service, a result of execution of a selected implementation of the AI inferencing model, wherein the instance of the AI inferencing model is selected by the gateway computing device based on the specification and the contextual data, and wherein the instance of the AI inferencing model operates on a specific hardware configuration of the remote cloud service.

In Example 66, the subject matter of Example 65 includes, means for invoking the instance of the AI inferencing model from among a plurality of implementations of the AI inferencing model based on a variation of the AI inferencing model, wherein at least two variations of the AI inferencing model exist within a respective hardware configuration in the remote cloud service, and wherein the at least two variations of the AI inferencing model are respectively customized to different data inputs provided in the contextual data.

In Example 67, the subject matter of Examples 65-66 includes, means for producing the contextual data for the AI inferencing operation based on an operational environment of the apparatus, wherein the contextual data indicates at least one of: condition of a network connection from the apparatus, sensor data collected from a sensor operable coupled to the apparatus, or pre-processing data produced by the apparatus.

In Example 68, the subject matter of Examples 65-67 includes, means for obtaining the contextual data, the contextual data including combined sensor data obtained from a plurality of sensors in communication with the apparatus; wherein the combined sensor data is considered in selecting the implementation of the AI inferencing model, and wherein the combined sensor data is provided as an input in the selected implementation of the AI inferencing model.

In Example 69, the subject matter of Examples 65-68 includes, means for registering, between the apparatus and the gateway computing device, a plurality of distinct AI inferencing models, wherein registering includes establishing a mapping of a model identifier of the AI inferencing model to a respective hardware configuration used in the remote cloud service; wherein the specification of the AI inferencing model indicates the model identifier.

In Example 70, the subject matter of Examples 65-69 includes, means for registering the specification of the AI inferencing model to be associated with a data set or a set of sensors of the apparatus; wherein operations at the gateway computing device of selecting the implementation of the AI inferencing model are performed subsequent to registering the specification of the AI inferencing model.

In Example 71, the subject matter of Examples 65-70 includes, means for invoking the implementation of the AI inferencing model based at least in part on time-adaptive considerations of execution of the selected implementation at the remote cloud service; wherein respective hardware implementations of the AI inferencing model are invoked at respective times.

In Example 72, the subject matter of Examples 65-71 includes, means for invoking respective hardware configurations at the remote cloud service; wherein the respective hardware configurations of the remote cloud service include at least one server appliance system and at least one field-programmable gate array (FPGA) configured to execute at least a portion of the implementation of the AI inferencing model.

In Example 73, the subject matter of Examples 65-72 includes, wherein the apparatus is connected to the gateway computing device via an Internet of Things (IoT) network topology.

Example 74 is a system to perform the operations of any of the Examples 1-73.

Example 75 is a method to perform the operations of any of the Examples 1-73.

In the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with a claim standing on its own as a separate embodiment.

What is claimed is:

1. A computing device comprising:
communication circuitry;
memory including executable instructions; and
processing circuitry, which when executing the instructions, cause the processing circuitry to:
receive, via the communication circuitry, from an edge device, a request for an artificial intelligence (AI) inferencing operation, wherein the request includes a model identifier of an AI inferencing model and data to be used as input to the AI inferencing model;
select, in response to the request, a version of the AI inferencing model at a remote computing system from among a plurality of versions of the AI inferencing model, based on the model identifier and the data to be used as input to the AI inferencing model;
cause transmission of an inference request, via the communication circuitry, to the remote computing system, the inference request to initiate execution of the version of the AI inferencing model at the remote computing system;
obtain, via the communication circuitry, from the remote computing system, inferencing results in response to the inference request; and
cause transmission of the inferencing results, via the communication circuitry, to the edge device.

2. The computing device of claim 1,
wherein the version of the AI inferencing model is selected from among the plurality of versions of the AI inferencing model based on a variation of the AI inferencing model,
wherein at least two variations of the AI inferencing model exist within a respective hardware configuration in the remote computing system, and
wherein the at least two variations of the AI inferencing model are respectively customized to different data inputs.

3. The computing device of claim 1,
wherein the data to be used as input for the AI inferencing model is produced based on an operational environment of the edge device, and
wherein the data to be used as input indicates at least one of: condition of a network connection with the edge device, sensor data collected from a sensor operably coupled to the edge device, or pre-processed data generated by the edge device.

4. The computing device of claim 1,
wherein the data to be used by the AI inferencing model includes sensor data combined from a plurality of sensors in communication with the edge device,
wherein the combined sensor data is considered in selecting the version of the AI inferencing model, and
wherein the combined sensor data is provided as an input to the selected version of the AI inferencing model.

5. A computing device comprising:
communication circuitry;
memory including executable instructions; and
processing circuitry, which when executing the instructions, cause the processing circuitry to:
receive, via the communication circuitry, from an edge device, a request for an artificial intelligence (AI) inferencing operation, wherein the request includes a specification an AI inferencing model and data to be used as input to the AI inferencing model;
select, in response to the request, a version of the AI inferencing model at a remote computing system from among a plurality of versions of the AI inferencing model, based on the specification and the data to be used as input to the AI inferencing model;
cause transmission of an inference request, via the communication circuitry, to the remote computing system, the inference request to initiate execution of the version of the AI inferencing model at the remote computing system;
obtain, via the communication circuitry, from the remote computing system, inferencing results in response to the inference request; and
cause transmission of the inferencing results, via the communication circuitry, to the edge device.

6. The computing device of claim 5, wherein the specification incudes a model identifier of the AI inferencing model.

7. The computing device of claim 5,
wherein the version of the AI inferencing model is selected from among the plurality of versions of the AI inferencing model based on a variation of the AI inferencing model,
wherein at least two variations of the AI inferencing model exist within a respective hardware configuration in the remote computing system, and
wherein the at least two variations of the AI inferencing model are respectively customized to different data inputs.

8. The computing device of claim 5,
wherein the data to be used as input for the AI inferencing model is produced based on an operational environment of the edge device, and
wherein the data to be used as input indicates at least one of: condition of a network connection with the edge device, sensor data collected from a sensor operably coupled to the edge device, or pre-processed data generated by the edge device.

9. The computing device of claim 5,
wherein the data to be used by the AI inferencing model includes sensor data combined from a plurality of sensors in communication with the edge device,
wherein the combined sensor data is considered in selecting the version of the AI inferencing model, and
wherein the combined sensor data is provided as an input to the selected version of the AI inferencing model.

10. An edge computing device comprising:

communication circuitry;

memory including executable instructions; and processing circuitry, which when executing the instructions, cause the processing circuitry to:

transmit, via the communication circuitry, to a gateway device, a request for an artificial intelligence (AI) inferencing operation, wherein the request includes a specification an AI inferencing model and data to be used as input to the AI inferencing model; and receive inferencing results, via the communication circuitry, from the gateway device, wherein the gateway device is configured to:

select, in response to the request, a version of the AI inferencing model at a remote computing system from among a plurality of versions of the AI inferencing model, based on the specification and the data to be used as input to the AI inferencing model;

cause transmission of an inference request to the remote computing system, the inference request to initiate execution of the version of the AI inferencing model at the remote computing system; and obtain, from the remote computing system, inferencing results in response to the inference request.

11. The edge computing device of claim 10, wherein the specification incudes a model identifier of the AI inferencing model.

12. The edge computing device of claim 10, wherein the version of the AI inferencing model is selected from among the plurality of versions of the AI inferencing model based on a variation of the AI inferencing model, wherein at least two variations of the AI inferencing model exist within a respective hardware configuration in the remote computing system, and wherein the at least two variations of the AI inferencing model are respectively customized to different data inputs.

13. The edge computing device of claim 10, wherein the data to be used as input for the AI inferencing model is produced based on an operational environment of the edge computing device, and wherein the data to be used as input indicates at least one of: condition of a network connection with the edge computing device, sensor data collected from a sensor operably coupled to the edge computing device, or pre-processed data generated by the edge computing device.

14. The edge computing device of claim 10, wherein the data to be used by the AI inferencing model includes sensor data combined from a plurality of sensors in communication with the edge device, wherein the combined sensor data is considered in selecting the version of the AI inferencing model, and wherein the combined sensor data is provided as an input to the selected version of the AI inferencing model.

* * * * *